US012682290B2

(12) United States Patent
Kosan et al.

(10) Patent No.: US 12,682,290 B2
(45) Date of Patent: Jul. 14, 2026

(54) METHOD, SYSTEM, AND COMPUTER PROGRAM PRODUCT FOR IMPROVING MACHINE LEARNING MODELS

(71) Applicant: Visa International Service Association, San Francisco, CA (US)

(72) Inventors: Mert Kosan, Austin, TX (US); Linyun He, Cedar Park, TX (US); Shubham Agrawal, Round Rock, TX (US); Yuhang Wu, Jersey City, NJ (US); Hongyi Liu, Santa Clara, CA (US); Chiranjeet Chetia, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/833,603

(22) PCT Filed: Jan. 3, 2024

(86) PCT No.: PCT/US2024/010107
§ 371 (c)(1),
(2) Date: Jul. 26, 2024

(87) PCT Pub. No.: WO2024/148038
PCT Pub. Date: Jul. 11, 2024

(65) Prior Publication Data
US 2025/0165874 A1      May 22, 2025

Related U.S. Application Data

(60) Provisional application No. 63/437,013, filed on Jan. 4, 2023.

(51) Int. Cl.
*G06N 20/20* (2019.01)

(52) U.S. Cl.
CPC ..................................... *G06N 20/20* (2019.01)

(58) Field of Classification Search
CPC ..................................................... G06N 20/20
(Continued)

(56) References Cited

U.S. PATENT DOCUMENTS 11,210,306 B2 * 12/2021 Steedman Henderson ..................
G06N 3/084
2017/0161640 A1 6/2017 Shamir
(Continued)

FOREIGN PATENT DOCUMENTS

WO        2022167302 A1      8/2022

OTHER PUBLICATIONS

Wu et al., "A survey of human-in-the-loop for machine learning", Future Generation Computer Systems, 135 (2022) 364-381, 2022 (Year: 2022).*
(Continued)

*Primary Examiner* — Tsu-Chang Lee
(74) *Attorney, Agent, or Firm* — The Webb Law Firm

(57) ABSTRACT

Methods, systems, and computer program products are provided for improving machine learning models which include receiving a data set including data records; inputting the data set to a pre-trained first machine learning model to generate first embeddings; inputting the first embeddings to a second machine learning model to generate second embeddings in a user-specific embedding space; inputting the plurality of second embeddings to a third machine learning model to extract feature data associated with a feature; inputting an output from a machine learning system and the feature data to a fourth machine learning model to generate a relevance score for each entity; determining a subset of entities based on the relevance score; communicating a feedback request to a user; receiving feedback data from the
(Continued)

ACTIVE LEARNING SYSTEM user; and training at least one of the models based on the feedback data.

17 Claims, 15 Drawing Sheets

(58) Field of Classification Search
USPC .......................................................... 706/12
See application file for complete search history.

(56) References Cited

U.S. PATENT DOCUMENTS

| | | |
|---|---|---|
| 2018/0330280 A1 | 11/2018 | Erenrich et al. |
| 2021/0081836 A1 | 3/2021 | Polleri et al. |
| 2021/0264220 A1 | 8/2021 | Wei et al. |
| 2021/0374348 A1 | 12/2021 | Dasgupta et al. |

OTHER PUBLICATIONS

Mosqueira-Rey, et al., "Human-in-the-loop machine learning: a state of the art", Artificial Intelligence Review (2023) 56:3005-3054, 2022 (Year: 2022).*
Holzinger et al., "Interactive machine learning for health informatics: when do we need the human-in-the-loop", Brain Informatics (2016) 3:119-131, 2006 (Year: 2006).*
Bobadilla et al., "Recommender systems survey", Knowledge-based systems, 2013, pp. 109-132, vol. 46.
Budd et al., "A survey on active learning and human-in-the-loop deep learning for medical image analysis", Medical Image Analysis, 2021, pp. 1-21, vol. 71.
Chandler et al., "Improving the Applicability of AI for Psychiatric Applications through Human-in-the-loop Methodologies", Schizophrenia Bulletin, 2022, pp. 949-957.
Chen et al., "Deepdriving: Learning affordance for direct perception in autonomous driving", Proceedings of the IEEE international conference on computer vision, 2015, pp. 2722-2730.
Cheng et al., "Wide & deep learning for recommender systems", Proceedings of the 1st workshop on deep learning for recommender systems, 2016, pp. 7-10.
Dash et al., "A review of some techniques for inclusion of domain-knowledge into deep neural networks", Scientific Reports, 2022, pp. 1-15, vol. 12, No. 1.
Dong et al., "Explainable automated coding of clinical notes using hierarchical label-wise attention networks and label embedding initialization", Journal of biomedical informatics, 2021, pp. 1-15, vol. 116.
Eldele et al., "Time-series representation learning via temporal and contextual contrasting", arXiv preprint arXiv:2106.14112 (2021).
Franceschi et al., "Unsupervised scalable representation learning for multivariate time series", Advances in neural information processing systems, 2019, vol. 32, pp. 1-25.
Huang et al., "Global Counterfactual Explainer for Graph Neural Networks", arXiv preprint arXiv:2210. 11695 (2022).
Kang et al., "Towards model-informed precision dosing with expert-in-the-loop machine learning", 2021 IEEE 22nd International Conference on Information Reuse and Integration for Data Science (IRI), IEEE, pp. 342-347.

Kazemi et al., "Time2vec: Learning a vector representation of time", arXivpreprint arXiv:1907.05321 (2019).
Kazemi et al., "Representation learning for dynamic graphs: A survey", J. Mach. Learn. Res. 21, 70 (2020), pp. 1-73.
Kosan et al., "Event detection on dynamic graphs", arXiv preprint arXiv:2110.12148 (2021).
Lai et al., "Towards a science of human-ai decision making: a survey of empirical studies", arXiv preprint arXiv:2112.11471 (2021).
Liang et al., "Human-Centered AI for Medical Imaging. Artificial Intelligence for Human Computer Interaction: A Modern Approach",2021, pp. 539-570.
Liu et al., "Deep reinforcement active learning for human-in-the-loop person reidentification", Proceedings of the IEEE/CVF international conference on computer vision, pp. 6122-6131.
Monarch, "Human-in-the-Loop Machine Learning: Active learning and annotation for human-centered AI", Simon and Schuster, 2021.
Peng, "A Survey on Modern Recommendation System based on Big Data", arXiv preprint arXiv:2206.02631 (2022).
Rudin, "Stop explaining black box machine learning models for high stakes decisions and use interpretable models instead", Nature Machine Intelligence, 2019, pp. 206-215, vol. 1, No. 5.
Sabitha et al., "User Interaction Based Recommender System Using Machine Learning", Intelligent Automation and Soft Computing, 2022, pp. 1037-1049, vol. 31, No. 2.
Shani et al., "Evaluating recommendation systems", Recommender systems handbook, Springer, pp. 257-297.
Stevens, "Knowledge in the grey zone: AI and cybersecurity", Digital War, 2020, pp. 164-170, vol. 1. No. 1.
Su et al., "Robust anomaly detection for multivariate time series through stochastic recurrent neural network", Proceedings of the 25th ACM SIGKDD international conference on knowledge discovery & data mining, pp. 2828-2837.
Wang et al., "Collaborative deep learning for recommender systems", Proceedings of the 21th ACM SIGKDD international conference on knowledge discovery and data mining, pp. 1235-1244.
Wu et al., "A survey of human-in-the-loop for machine learning", Future Generation Computer Systems, 2022, pp. 1-22.
Zehlike et al., "Fairness in ranking, part ii: Learning-to-rank and recommender systems", ACM Computing Surveys (CSUR), 2022, pp. 1-41, vol. 55, No. 6, art. 117.
Zerveas et al., "A transformer-based framework for multivariate time series representation learning", Proceedings of the 27th ACM SIGKDD Conference on Knowledge Discovery & Data Mining, 2021, pp. 2114-2124.
Zhang et al., "Deep learning based recommender system: A survey and new perspectives", ACM Computing Surveys (CSUR), 2019, pp. 1-38, vol. 52, No. 1.
Zhang et al., "Explainable recommendation: A survey and new perspectives", Foundations and TrendsR in Information Retrieval, 2020, pp. 1-101, vol. 14, No. 1.
Zheng et al., "Tracer: A framework for facilitating accurate and interpretable analytics for high stakes applications", Proceedings of the 2020 ACM SIGMOD International Conference on Management of Data, 2020, pp. 1747-1763.
Vliegenthart et al., "Coner: A Collaborative Approach for Long-Tail Named Entity Recognition in Scientific Publications", Advances in Databases and Information Systems, 2019.

* cited by examiner

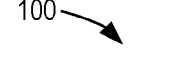
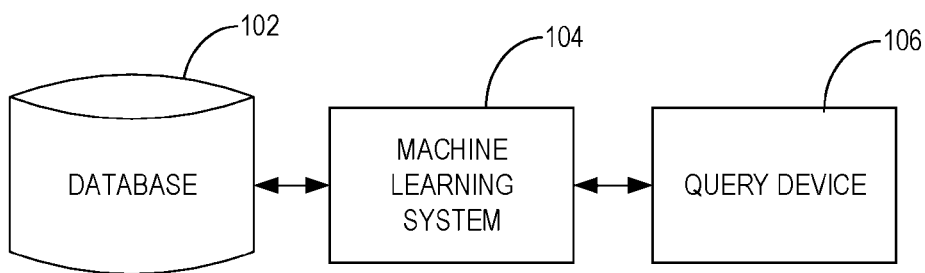
FIG. 1

ENTITIES

ENTITY EMBEDDING SPACE

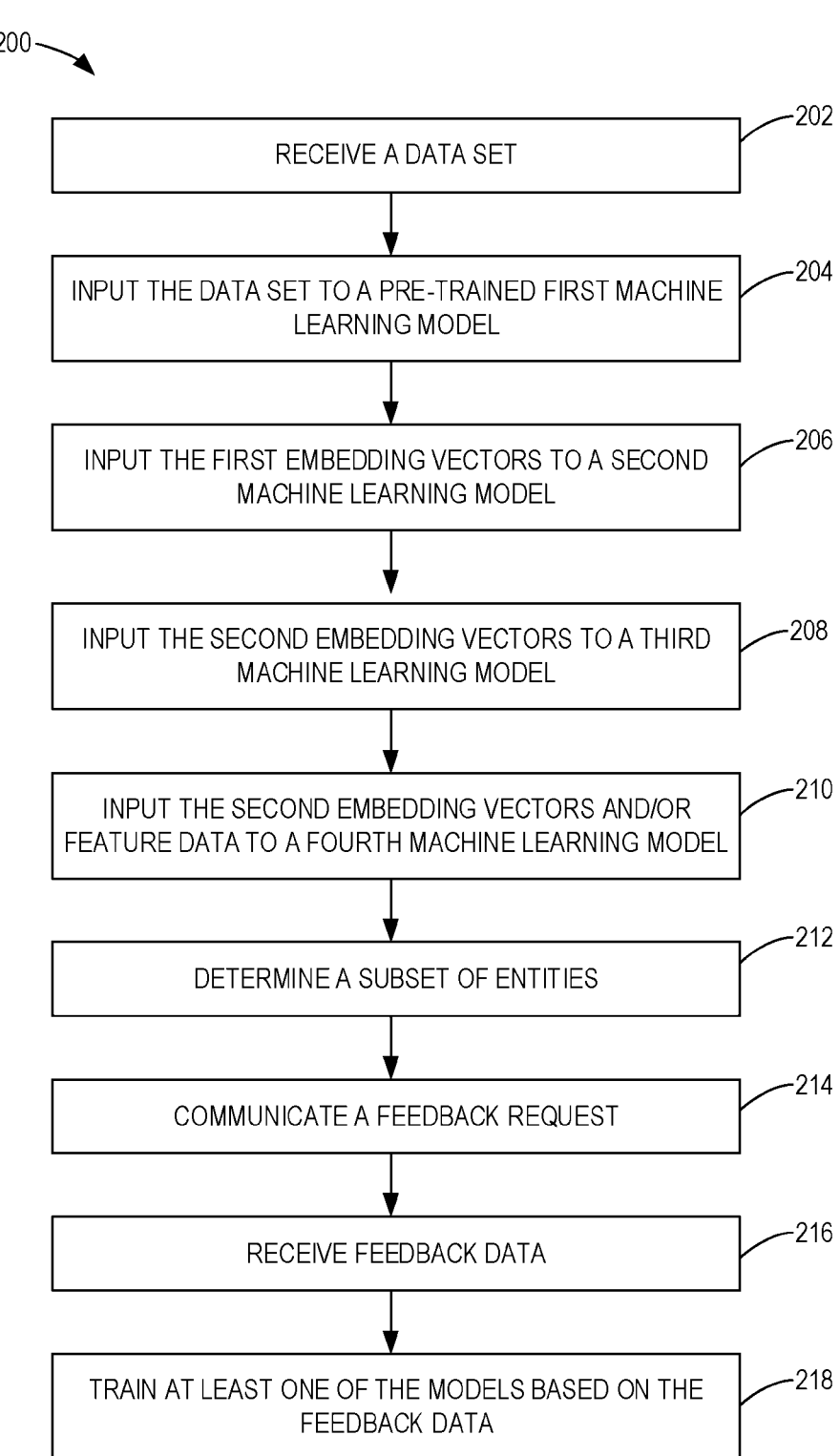

200

202 — RECEIVE A DATA SET

204 — INPUT THE DATA SET TO A PRE-TRAINED FIRST MACHINE LEARNING MODEL

206 — INPUT THE FIRST EMBEDDING VECTORS TO A SECOND MACHINE LEARNING MODEL

208 — INPUT THE SECOND EMBEDDING VECTORS TO A THIRD MACHINE LEARNING MODEL

210 — INPUT THE SECOND EMBEDDING VECTORS AND/OR FEATURE DATA TO A FOURTH MACHINE LEARNING MODEL

212 — DETERMINE A SUBSET OF ENTITIES

214 — COMMUNICATE A FEEDBACK REQUEST

216 — RECEIVE FEEDBACK DATA

218 — TRAIN AT LEAST ONE OF THE MODELS BASED ON THE FEEDBACK DATA

METHOD, SYSTEM, AND COMPUTER PROGRAM PRODUCT FOR IMPROVING MACHINE LEARNING MODELS

CROSS REFERENCE TO RELATED APPLICATIONS

This application is the United States national phase application of International Patent Application No.: PCT/US2024/010107 filed Jan. 3, 2024, and claims priority to U.S. Provisional Patent Application No. 63/437,013, filed Jan. 4, 2023, the disclosures of which are hereby incorporated by reference in their entireties.

BACKGROUND

1. Technical Field

This disclosure relates generally to analyzing and/or improving machine learning models and, in some non-limiting embodiments or aspects, to methods, systems, and computer program products for analyzing and/or improving machine learning models.

2. Technical Considerations

Machine learning models are powerful tools that can identify patterns and/or generate decisions based on a data set. Machine learning models may be trained by inputting training data and updating parameters of the models based on outputs generated by the model in response to the training data. However, these models can be prone to errors, and it can be hard to maintain performance of the model over time. For example, performance of the model may degrade over time due to lack of supervision.

SUMMARY

Accordingly, provided are improved methods, systems, and computer program products for analyzing and/or improving machine learning models.

According to non-limiting embodiments or aspects, provided is a computer-implemented method. The method may include receiving, with at least one processor, a data set including a plurality of data records. Each data record of the plurality of data records may be associated with an entity of a plurality of entities. The method may include inputting, with at least one processor, the data set to a pre-trained first machine learning model to generate a plurality of first embedding vectors. Each respective first embedding vector of the plurality of first embedding vectors may be associated with a respective entity of the plurality of entities. The method may include inputting, with at least one processor, the plurality of first embedding vectors to a second machine learning model to generate a plurality of second embedding vectors by mapping each respective first embedding vector of the plurality of first embedding vectors to a respective second embedding vector in a user-specific embedding space associated with a user. The method may include inputting, with at least one processor, the plurality of second embedding vectors to a third machine learning model to extract feature data associated with at least one feature based on the plurality of second embedding vectors. The method may include inputting, with at least one processor, an output from a machine learning system and the feature data to a fourth machine learning model to generate a relevance score for each entity of the plurality of entities. The method may include determining, with at least one processor, a subset of entities of the plurality of entities based on the relevance score for each entity of the subset of entities. The method may include communicating, with at least one processor, a feedback request to a user device of the user based on the subset of entities. The method may include receiving, with at least one processor, feedback data from the user device for each entity of the subset of entities. The method may include training, with at least one processor, at least one of the following: the second machine learning model, the third machine learning model, the fourth machine learning model, or any combination thereof based on the feedback data.

In some non-limiting embodiments or aspects, training the at least one of the following: the second machine learning model, the third machine learning model, the fourth machine learning model, or any combination thereof may include modifying at least one parameter of at least one of the following: the second machine learning model, the third machine learning model, the fourth machine learning model, or any combination thereof based on the feedback data.

In some non-limiting embodiments or aspects, the feedback data may include a binary classification for each entity of the subset of entities.

In some non-limiting embodiments or aspects, the data set may include multivariate time-series data including the plurality of data records, each respective data record of the plurality of data records including data elements based on a time sequence for a plurality of variables.

In some non-limiting embodiments or aspects, the data set may include transaction data associated with a plurality of transactions, each data record associated with at least one transaction of the plurality of transactions.

In some non-limiting embodiments or aspects, the relevance score may be associated with at least one of the following: an authorization decision, a fraud determination, a credit application decision, an insurance application decision, or any combination thereof.

In some non-limiting embodiments or aspects, training the at least one of the following: the second machine learning model, the third machine learning model, the fourth machine learning model, or any combination thereof may include determining, with at least one processor, a loss based on the feedback data and a loss function and training, with at least one processor, the at least one of the following: the second machine learning model, the third machine learning model, the fourth machine learning model, or any combination thereof based on the loss.

In some non-limiting embodiments or aspects, the loss function may include at least one of the following: a first component to widen a gap between pairs of entities of the subset of entities having feedback data associated with a correct relative ranking between entities of each pair of entities based on the relevance scores thereof, a second component configured to narrow a gap between pairs of entities of the subset of entities having feedback data associated with an incorrect relative ranking between entities of each pair of entities based on the relevance scores thereof, a third component configured to narrow a gap between entities of the subset of entities having feedback data associated with an incorrect relative ranking between the entities of the subset of entities and other entities of the plurality of entities not included in the subset of entities, or any combination thereof.

In some non-limiting embodiments or aspects, the loss function may further include a first hyperparameter for the first component, a second hyperparameter for the second component, and a third hyperparameter for the third component. The subset of entities may include a predetermined number of entities having one of a highest relevance score or a lowest relevance score.

According to non-limiting embodiments or aspects, provided is a system including at least one processor configured to receive a data set including a plurality of data records, each data record of the plurality of data records associated with an entity of a plurality of entities; input the data set to a pre-trained first machine learning model to generate a plurality of first embedding vectors, each respective first embedding vector of the plurality of first embedding vectors associated with a respective entity of the plurality of entities; input the plurality of first embedding vectors to a second machine learning model to generate a plurality of second embedding vectors by mapping each respective first embedding vector of the plurality of first embedding vectors to a respective second embedding vector in a user-specific embedding space associated with a user; input the plurality of second embedding vectors to a third machine learning model to extract feature data associated with at least one feature based on the plurality of second embedding vectors; input an output from a machine learning system and the feature data to a fourth machine learning model to generate a relevance score for each entity of the plurality of entities; determine a subset of entities of the plurality of entities based on the relevance score for each entity of the subset of entities; communicate a feedback request to a user device of the user based on the subset of entities; receive feedback data from the user device for each entity of the subset of entities; and train at least one of the following: the second machine learning model, the third machine learning model, the fourth machine learning model, or any combination thereof based on the feedback data.

In some non-limiting embodiments or aspects, training the at least one of the following: the second machine learning model, the third machine learning model, the fourth machine learning model, or any combination thereof may include modifying at least one parameter of at least one of the following: the second machine learning model, the third machine learning model, the fourth machine learning model, or any combination thereof based on the feedback data.

In some non-limiting embodiments or aspects, the feedback data may include a binary classification for each entity of the subset of entities.

In some non-limiting embodiments or aspects, the data set may include multivariate time-series data including the plurality of data records, each respective data record of the plurality of data records including data elements based on a time sequence for a plurality of variables.

In some non-limiting embodiments or aspects, the data set may include transaction data associated with a plurality of transactions, each data record associated with at least one transaction of the plurality of transactions.

In some non-limiting embodiments or aspects, the relevance score may be associated with at least one of the following: an authorization decision, a fraud determination, a credit application decision, an insurance application decision, or any combination thereof.

In some non-limiting embodiments or aspects, training the at least one of the following: the second machine learning model, the third machine learning model, the fourth machine learning model, or any combination thereof may include the at least one processor configured to: determine a loss based on the feedback data and a loss function; and train the at least one of the following: the second machine learning model, the third machine learning model, the fourth machine learning model, or any combination thereof based on the loss.

In some non-limiting embodiments or aspects, the loss function may include at least one of the following: a first component to widen a gap between pairs of entities of the subset of entities having feedback data associated with a correct relative ranking between entities of each pair of entities based on the relevance scores thereof; a second component configured to narrow a gap between pairs of entities of the subset of entities having feedback data associated with an incorrect relative ranking between entities of each pair of entities based on the relevance scores thereof; a third component configured to narrow a gap between entities of the subset of entities having feedback data associated with an incorrect relative ranking between the entities of the subset of entities and other entities of the plurality of entities not included in the subset of entities, or any combination thereof.

In some non-limiting embodiments or aspects, the loss function may further include a first hyperparameter for the first component, a second hyperparameter for the second component, and a third hyperparameter for the third component.

In some non-limiting embodiments or aspects, the subset of entities may include a predetermined number of entities having one of a highest relevance score or a lowest relevance score.

According to non-limiting embodiments or aspects, provided is a computer program product including at least one non-transitory computer-readable medium including program instructions that, when executed by at least one processor, cause the at least one processor to receive a data set including a plurality of data records, each data record of the plurality of data records associated with an entity of a plurality of entities; input the data set to a pre-trained first machine learning model to generate a plurality of first embedding vectors, each respective first embedding vector of the plurality of first embedding vectors associated with a respective entity of the plurality of entities; input the plurality of first embedding vectors to a second machine learning model to generate a plurality of second embedding vectors by mapping each respective first embedding vector of the plurality of first embedding vectors to a respective second embedding vector in a user-specific embedding space associated with a user; input the plurality of second embedding vectors to a third machine learning model to extract feature data associated with at least one feature based on the plurality of second embedding vectors; an output from a machine learning system and the feature data to a fourth machine learning model to generate a relevance score for each entity of the plurality of entities; determine a subset of entities of the plurality of entities based on the relevance score for each entity of the subset of entities; communicate a feedback request to a user device of the user based on the subset of entities; receive feedback data from the user device for each entity of the subset of entities; and train at least one of the following: the second machine learning model, the third machine learning model, the fourth machine learning model, or any combination thereof based on the feedback data.

In some non-limiting embodiments or aspects, training the at least one of the following: the second machine learning model, the third machine learning model, or the fourth machine learning model may include modifying at least one parameter of at least one of the second machine learning model, the third machine learning model, the fourth machine learning model, or any combination thereof based on the feedback data.

In some non-limiting embodiments or aspects, the feedback data may include a binary classification for each entity of the subset of entities.

In some non-limiting embodiments or aspects, the data set may include multivariate time-series data including the plurality of data records, each respective data record of the plurality of data records including data elements based on a time sequence for a plurality of variables.

In some non-limiting embodiments or aspects, the data set may include transaction data associated with a plurality of transactions, each data record associated with at least one transaction of the plurality of transactions.

In some non-limiting embodiments or aspects, the relevance score may be associated with at least one of the following: an authorization decision, a fraud determination, a credit application decision, an insurance application decision, or any combination thereof.

In some non-limiting embodiments or aspects, training the at least one of the following: the second machine learning model, the third machine learning model, the fourth machine learning model, or any combination thereof may include the program instructions causing the at least one processor to: determine a loss based on the feedback data and a loss function; and train the at least one of the following: the second machine learning model, the third machine learning model, the fourth machine learning model, or any combination thereof based on the loss.

In some non-limiting embodiments or aspects, the loss function may include at least one of the following: a first component to widen a gap between pairs of entities of the subset of entities having feedback data associated with a correct relative ranking between entities of each pair of entities based on the relevance scores thereof; a second component configured to narrow a gap between pairs of entities of the subset of entities having feedback data associated with an incorrect relative ranking between entities of each pair of entities based on the relevance scores thereof; a third component configured to narrow a gap between entities of the subset of entities having feedback data associated with an incorrect relative ranking between the entities of the subset of entities and other entities of the plurality of entities not included in the subset of entities, or any combination thereof.

In some non-limiting embodiments or aspects, the loss function may further include a first hyperparameter for the first component, a second hyperparameter for the second component, and a third hyperparameter for the third component.

In some non-limiting embodiments or aspects, the subset of entities may include a predetermined number of entities having one of a highest relevance score or a lowest relevance score.

According to non-limiting embodiments or aspects, provided is a computer-implemented method that includes: receiving, with at least one processor, a data set including a plurality of data records, each data record of the plurality of data records associated with an entity of a plurality of entities; inputting, with at least one processor, the data set to a pre-trained first machine learning model to generate a plurality of first embedding vectors, each respective first embedding vector of the plurality of first embedding vectors associated with a respective entity of the plurality of entities; inputting, with at least one processor, the plurality of first embedding vectors to a second machine learning model to generate a plurality of second embedding vectors by mapping each respective first embedding vector of the plurality of first embedding vectors to a respective second embedding vector in a user-specific embedding space associated with a user; inputting, with at least one processor, the plurality of second embedding vectors to a third machine learning model to extract feature data associated with at least one feature based on the plurality of second embedding vectors; inputting, with at least one processor, at least one of the following: an output from a machine learning system, the plurality of first embedding vectors, the plurality of second embedding vectors, the feature data, or any combination thereof to a fourth machine learning model to generate a relevance score for each entity of the plurality of entities; determining, with at least one processor, a subset of entities of the plurality of entities based on the relevance score for each entity of the subset of entities; communicating, with at least one processor, a feedback request to a user device of the user based on the subset of entities; receiving, with at least one processor, feedback data from the user device for each entity of the subset of entities; and training, with at least one processor, at least one of the following: the second machine learning model, the third machine learning model, the fourth machine learning model, or any combination thereof based on the feedback data.

In some non-limiting embodiments or aspects at least two of the output from a machine learning system, the plurality of first embedding vectors, the plurality of second embedding vectors, and the feature data may be input to the fourth machine learning model to generate the relevance score for each entity of the plurality of entities.

In some non-limiting embodiments or aspects the output from a machine learning system may be input to the fourth machine learning model to generate the relevance score for each entity of the plurality of entities.

In some non-limiting embodiments or aspects the plurality of first embedding vectors may be input to the fourth machine learning model to generate the relevance score for each entity of the plurality of entities.

In some non-limiting embodiments or aspects the plurality of second embedding vectors may be input to the fourth machine learning model to generate the relevance score for each entity of the plurality of entities.

In some non-limiting embodiments or aspects the feature data may be input to the fourth machine learning model to generate the relevance score for each entity of the plurality of entities.

Further non-limiting embodiments or aspects are set forth in the following numbered clauses:

Clause 1: A computer-implemented method, comprising: receiving, with at least one processor, a data set comprising a plurality of data records, each data record of the plurality of data records associated with an entity of a plurality of entities; inputting, with at least one processor, the data set to a pre-trained first machine learning model to generate a plurality of first embedding vectors, each respective first embedding vector of the plurality of first embedding vectors associated with a respective entity of the plurality of entities; inputting, with at least one processor, the plurality of first embedding vectors to a second machine learning model to generate a plurality of second embedding vectors by mapping each respective first embedding vector of the plurality of first embedding vectors to a respective second embedding vector in a user-specific embedding space associated with a user; inputting, with at least one processor, the plurality of second embedding vectors to a third machine learning model to extract feature data associated with at least one feature based on the plurality of second embedding vectors; inputting, with at least one processor, an output from a machine learning system and the feature data to a fourth machine learning model to generate a relevance score for each entity of the plurality of entities; determining, with at least one processor, a subset of entities of the plurality of entities based on the relevance score for each entity of the subset of entities; communicating, with at least one processor, a feedback request to a user device of the user based on the subset of entities; receiving, with at least one processor, feedback data from the user device for each entity of the subset of entities; and training, with at least one processor, at least one of the following: the second machine learning model, the third machine learning model, the fourth machine learning model, or any combination thereof based on the feedback data.

Clause 2: The method of clause 1, wherein training the at least one of the following: the second machine learning model, the third machine learning model, or the fourth machine learning model comprises modifying at least one parameter of at least one of the second machine learning model, the third machine learning model, the fourth machine learning model, or any combination thereof based on the feedback data.

Clause 3: The method of clause 1 or 2, wherein the feedback data comprises a binary classification for each entity of the subset of entities.

Clause 4: The method of any of clauses 1-3, wherein the data set comprises multivariate time-series data comprising the plurality of data records, each respective data record of the plurality of data records comprising data elements based on a time sequence for a plurality of variables.

Clause 5: The method of any of clauses 1-4, wherein the data set comprises transaction data associated with a plurality of transactions, each data record associated with at least one transaction of the plurality of transactions.

Clause 6: The method of any of clauses 1-5, wherein the relevance score is associated with at least one of the following: an authorization decision, a fraud determination, a credit application decision, an insurance application decision, or any combination thereof.

Clause 7: The method of any of clauses 1-6, wherein training the at least one of the following: the second machine learning model, the third machine learning model, the fourth machine learning model, or any combination thereof comprises: determining, with at least one processor, a loss based on the feedback data and a loss function; and training, with at least one processor, the at least one of the following: the second machine learning model, the third machine learning model, the fourth machine learning model, or any combination thereof based on the loss.

Clause 8: The method of any of clauses 1-7, wherein the loss function comprises at least one of the following: a first component to widen a gap between pairs of entities of the subset of entities having feedback data associated with a correct relative ranking between entities of each pair of entities based on the relevance scores thereof; a second component configured to narrow a gap between pairs of entities of the subset of entities having feedback data associated with an incorrect relative ranking between entities of each pair of entities based on the relevance scores thereof; a third component configured to narrow a gap between entities of the subset of entities having feedback data associated with an incorrect relative ranking between the entities of the subset of entities and other entities of the plurality of entities not included in the subset of entities, or any combination thereof.

Clause 9: The method of any of clauses 1-8, wherein the loss function further comprises a first hyperparameter for the first component, a second hyperparameter for the second component, and a third hyperparameter for the third component.

Clause 10: The method of any of clauses 1-9, wherein the subset of entities comprises a predetermined number of entities having one of a highest relevance score or a lowest relevance score.

Clause 11: A system comprising at least one processor configured to: receive a data set comprising a plurality of data records, each data record of the plurality of data records associated with an entity of a plurality of entities; input the data set to a pre-trained first machine learning model to generate a plurality of first embedding vectors, each respective first embedding vector of the plurality of first embedding vectors associated with a respective entity of the plurality of entities; input the plurality of first embedding vectors to a second machine learning model to generate a plurality of second embedding vectors by mapping each respective first embedding vector of the plurality of first embedding vectors to a respective second embedding vector in a user-specific embedding space associated with a user; input the plurality of second embedding vectors to a third machine learning model to extract feature data associated with at least one feature based on the plurality of second embedding vectors; input an output from a machine learning system and the feature data to a fourth machine learning model to generate a relevance score for each entity of the plurality of entities; determine a subset of entities of the plurality of entities based on the relevance score for each entity of the subset of entities; communicate a feedback request to a user device of the user based on the subset of entities; receive feedback data from the user device for each entity of the subset of entities; and train at least one of the following: the second machine learning model, the third machine learning model, the fourth machine learning model, or any combination thereof based on the feedback data.

Clause 12: The system of clause 11, wherein training the at least one of the following: the second machine learning model, the third machine learning model, the fourth machine learning model, or any combination thereof comprises modifying at least one parameter of at least one of the following: the second machine learning model, the third machine learning model, the fourth machine learning model, or any combination thereof based on the feedback data.

Clause 13: The system of clause 11 or 12, wherein the feedback data comprises a binary classification for each entity of the subset of entities.

Clause 14: The system of any of clauses 11-13, wherein the data set comprises multivariate time-series data comprising the plurality of data records, each respective data record of the plurality of data records comprising data elements based on a time sequence for a plurality of variables.

Clause 15: The system of any of clauses 11-14, wherein the data set comprises transaction data associated with a plurality of transactions, each data record associated with at least one transaction of the plurality of transactions.

Clause 16: The system of any of clauses 11-15, wherein the relevance score is associated with at least one of the following: an authorization decision, a fraud determination, a credit application decision, an insurance application decision, or any combination thereof.

Clause 17: The system of any of clauses 11-16, wherein training the at least one of the following: the second machine learning model, the third machine learning model, the fourth machine learning model, or any combination thereof comprises the at least one processor configured to: determine a loss based on the feedback data and a loss function; and train the at least one of the following: the second machine learning model, the third machine learning model, the fourth machine learning model, or any combination thereof based on the loss.

Clause 18: The system of any of clauses 11-17, wherein the loss function comprises at least one of the following: a first component to widen a gap between pairs of entities of the subset of entities having feedback data associated with a correct relative ranking between entities of each pair of entities based on the relevance scores thereof; a second component configured to narrow a gap between pairs of entities of the subset of entities having feedback data associated with an incorrect relative ranking between entities of each pair of entities based on the relevance scores thereof; a third component configured to narrow a gap between entities of the subset of entities having feedback data associated with an incorrect relative ranking between the entities of the subset of entities and other entities of the plurality of entities not included in the subset of entities, or any combination thereof.

Clause 19: The system of any of clauses 11-18, wherein the loss function further comprises a first hyperparameter for the first component, a second hyperparameter for the second component, and a third hyperparameter for the third component.

Clause 20: The system of any of clauses 11-19, wherein the subset of entities comprises a predetermined number of entities having one of a highest relevance score or a lowest relevance score.

Clause 21: A computer program product, comprising at least one non-transitory computer-readable medium including program instructions that, when executed by at least one processor, cause the at least one processor to: receive a data set comprising a plurality of data records, each data record of the plurality of data records associated with an entity of a plurality of entities; input the data set to a pre-trained first machine learning model to generate a plurality of first embedding vectors, each respective first embedding vector of the plurality of first embedding vectors associated with a respective entity of the plurality of entities; input the plurality of first embedding vectors to a second machine learning model to generate a plurality of second embedding vectors by mapping each respective first embedding vector of the plurality of first embedding vectors to a respective second embedding vector in a user-specific embedding space associated with a user; input the plurality of second embedding vectors to a third machine learning model to extract feature data associated with at least one feature based on the plurality of second embedding vectors; input an output from a machine learning system and the feature data to a fourth machine learning model to generate a relevance score for each entity of the plurality of entities; determine a subset of entities of the plurality of entities based on the relevance score for each entity of the subset of entities; communicate a feedback request to a user device of the user based on the subset of entities; receive feedback data from the user device for each entity of the subset of entities; and train at least one of the following: the second machine learning model, the third machine learning model, the fourth machine learning model, or any combination thereof based on the feedback data.

Clause 22: The computer program product of clause 21, wherein training the at least one of the following: the second machine learning model, the third machine learning model, the fourth machine learning model, or any combination thereof comprises modifying at least one parameter of at least one of the following: the second machine learning model, the third machine learning model, the fourth machine learning model, or any combination thereof based on the feedback data.

Clause 23: The computer program product of clause 21 or 22, wherein the feedback data comprises a binary classification for each entity of the subset of entities.

Clause 24: The computer program product of any of clauses 21-23, wherein the data set comprises multivariate time-series data comprising the plurality of data records, each respective data record of the plurality of data records comprising data elements based on a time sequence for a plurality of variables.

Clause 25: The computer program product of any of clauses 21-24, wherein the data set comprises transaction data associated with a plurality of transactions, each data record associated with at least one transaction of the plurality of transactions.

Clause 26: The computer program product of any of clauses 21-25, wherein the relevance score is associated with at least one of the following: an authorization decision, a fraud determination, a credit application decision, an insurance application decision, or any combination thereof.

Clause 27: The computer program product of any of clauses 21-26, wherein training the at least one of the following: the second machine learning model, the third machine learning model, the fourth machine learning model, or any combination thereof comprises the program instructions causing the at least one processor to: determine a loss based on the feedback data and a loss function; and train the at least one of the following: the second machine learning model, the third machine learning model, the fourth machine learning model, or any combination thereof based on the loss.

Clause 28: The computer program product of any of clauses 21-27, wherein the loss function comprises at least one of the following: a first component to widen a gap between pairs of entities of the subset of entities having feedback data associated with a correct relative ranking between entities of each pair of entities based on the relevance scores thereof; a second component configured to narrow a gap between pairs of entities of the subset of entities having feedback data associated with an incorrect relative ranking between entities of each pair of entities based on the relevance scores thereof; a third component configured to narrow a gap between entities of the subset of entities having feedback data associated with an incorrect relative ranking between the entities of the subset of entities and other entities of the plurality of entities not included in the subset of entities, or any combination thereof.

Clause 29: The computer program product of any of clauses 21-28, wherein the loss function further comprises a first hyperparameter for the first component, a second hyperparameter for the second component, and a third hyperparameter for the third component.

Clause 30: The computer program product of any of clauses 21-29, wherein the subset of entities comprises a predetermined number of entities having one of a highest relevance score or a lowest relevance score.

Clause 31: A computer-implemented method, comprising: receiving, with at least one processor, a data set comprising a plurality of data records, each data record of the plurality of data records associated with an entity of a plurality of entities; inputting, with at least one processor, the data set to a pre-trained first machine learning model to generate a plurality of first embedding vectors, each respective first embedding vector of the plurality of first embedding vectors associated with a respective entity of the plurality of entities; inputting, with at least one processor, the plurality of first embedding vectors to a second machine learning model to generate a plurality of second embedding vectors by mapping each respective first embedding vector of the plurality of first embedding vectors to a respective second embedding vector in a user-specific embedding space associated with a user; inputting, with at least one processor, the plurality of second embedding vectors to a third machine learning model to extract feature data associated with at least one feature based on the plurality of second embedding vectors; inputting, with at least one processor, at least one of the following: an output from a machine learning system, the plurality of first embedding vectors, the plurality of second embedding vectors, the feature data, or any combination thereof to a fourth machine learning model to generate a relevance score for each entity of the plurality of entities; determining, with at least one processor, a subset of entities of the plurality of entities based on the relevance score for each entity of the subset of entities; communicating, with at least one processor, a feedback request to a user device of the user based on the subset of entities; receiving, with at least one processor, feedback data from the user device for each entity of the subset of entities; and training, with at least one processor, at least one of the following: the second machine learning model, the third machine learning model, the fourth machine learning model, or any combination thereof based on the feedback data.

Clause 32: The computer-implemented method of clause 31, wherein at least two of the output from a machine learning system, the plurality of first embedding vectors, the plurality of second embedding vectors, and the feature data are input to the fourth machine learning model to generate the relevance score for each entity of the plurality of entities.

Clause 33: The computer-implemented method of clause 31 or 32, wherein the output from a machine learning system is input to the fourth machine learning model to generate the relevance score for each entity of the plurality of entities.

Clause 34: The computer-implemented method of any of clauses 31-33, wherein the plurality of first embedding vectors are input to the fourth machine learning model to generate the relevance score for each entity of the plurality of entities.

Clause 35: The computer-implemented method of any of clauses 31-34, wherein the plurality of second embedding vectors are input to the fourth machine learning model to generate the relevance score for each entity of the plurality of entities.

Clause 36: The computer-implemented method of any of clauses 31-35, wherein the feature data is input to the fourth machine learning model to generate the relevance score for each entity of the plurality of entities.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 1 is a schematic diagram of an example system for analyzing and/or improving machine learning models, according to some non-limiting embodiments or aspects;

FIG. 9 is a flow diagram of a method for analyzing and/or improving machine learning models, according to some non-limiting embodiments or aspects;

DETAILED DESCRIPTION

Figure 2:
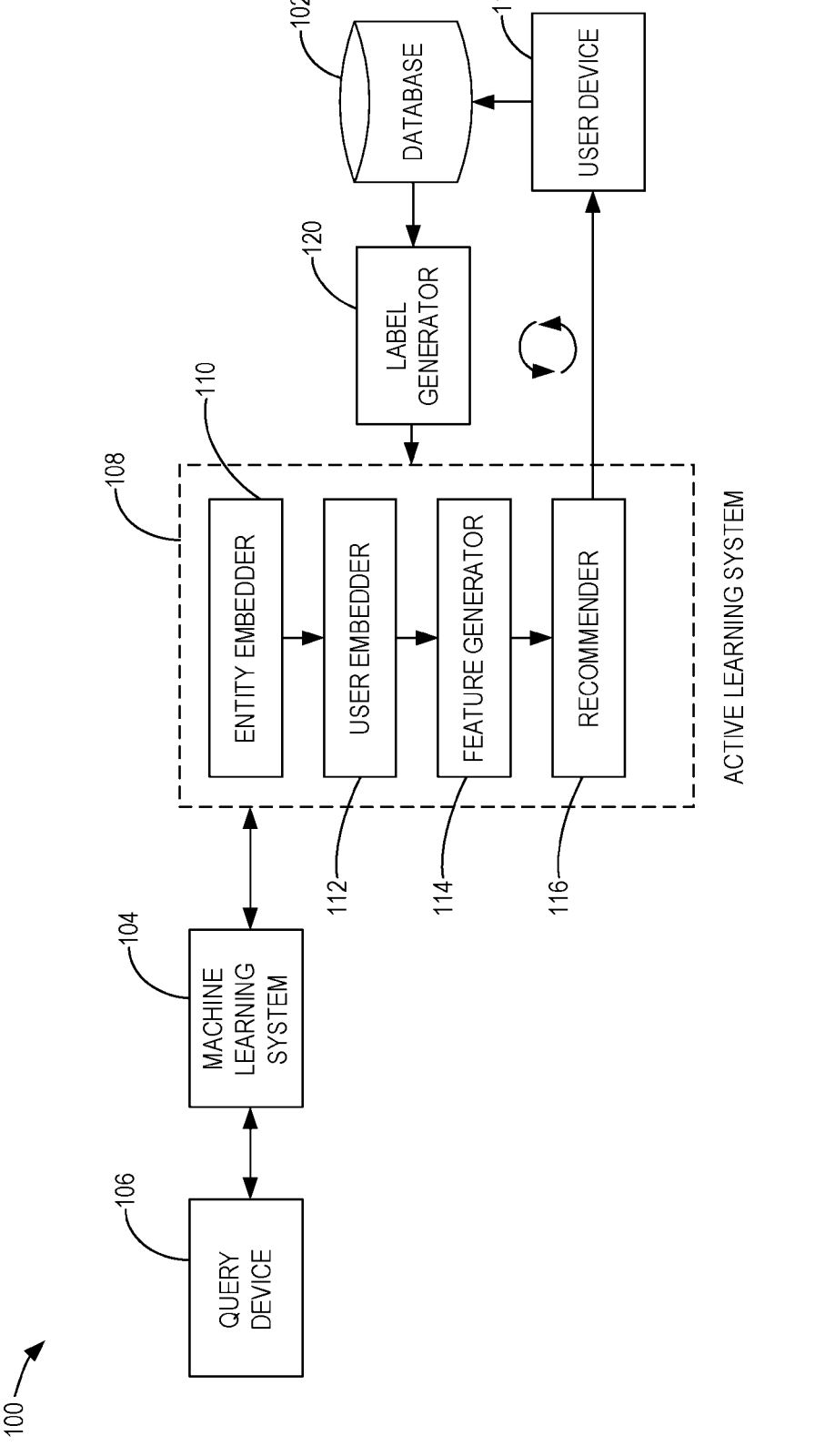
FIG. 2 is a schematic diagram of an example system for analyzing and/or improving machine learning models, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers configured to process online payment transactions through webpages, mobile applications, and/or the like.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to systems, methods, and computer program products for analyzing and/or improving machine learning models. For example, non-limiting embodiments or aspects include a machine learning system comprising a plurality of machine learning models in separate layers performing different tasks that are combined so that subsequent layers receive and rely on outputs of the preceding layers, which improves the decisions generated by the machine learning model. The system may employ a plurality of machine learning models. A data set may be input into a pre-trained first machine learning model to generate a plurality of first embedding vectors, each respective first embedding vector of the plurality of first embedding vectors associated with a respective entity. The plurality of first embedding vectors may be input into a second machine learning model to generate a plurality of second embedding vectors by mapping each respective first embedding vector of the plurality of first embedding vectors to a respective second embedding vector in a user-specific embedding space associated with a user. The plurality of second embedding vectors may be input into a third machine learning model to extract feature data associated with at least one feature based on the plurality of second embedding vectors. The plurality of second embedding vectors and the feature data may be input to a fourth machine learning model to generate a relevance score for each entity.

Non-limiting embodiments or aspects of the disclosed subject matter include a feedback loop that receives user feedback to confirm or correct decisions of the model associated with potentially anomalous outputs. The feedback data received from the feedback loops is used to train the machine learning models and layers to further improve the accuracy of the model. A loss function separated into a plurality of components, each targeted to correct different aspects of the model is employed by the system to train and improve the model.

The feedback data may improve the models outputs with respect to the entities, such that the model makes more accurate predictions for events associated with the entity. The feedback data may improve the models outputs with respect to the users, such that the model makes more accurate predictions with respect to which of the users is most relevant to the entity and/or the event of the entity, leading to more accurate feedback from the most relevant user(s), thus further improving the predictions for events associated with the entity. Therefore, non-limiting embodiments or aspects of the disclosure improve machine learning models, and the accuracy of the decisions resulting therefrom, due at least in part on the unique and unconventional arrangement of the plurality of machine learning models and layers and the updating thereof using feedback data from the feedback loop and the multi-component loss function.

For the purpose of illustration, in the following description, while the presently disclosed subject matter is described with respect to systems, methods, and computer program products for analyzing and/or improving machine learning models, one skilled in the art will recognize that the disclosed subject matter is not limited to the illustrative embodiments.

Referring to FIG. 1, an example system 100 is shown for analyzing and/or improving machine learning models according to some non-limiting embodiments or aspects. The system 100 may include a database 102, a machine learning system 104, and a query device 106.

Database 102 may include at least one computing device, as described herein. In some non-limiting embodiments or aspects, database 102 may store at least one data set comprising a plurality of data records. In some non-limiting embodiments or aspects, database 102 may be in communication with machine learning system 104, e.g., to communicate at least a portion of a data set to machine learning system 104 for analysis and/or receive and store data (e.g., outputs, relevance scores, loss values, and/or the like) from machine learning system 104. In some non-limiting embodiments or aspects, the data set stored in database 102 may include transaction data (e.g., real-time and/or streaming transaction data, historical transaction data, any combination thereof, and/or the like). In some non-limiting embodiments or aspects, database 102 may be in communication with query device 106, e.g., to communicate data (e.g., outputs, relevance scores, loss values, and/or the like) to query device 106 and/or to receive and store feedback data from query device 106.

Machine learning system 104 may include at least one computing device, as described herein. In some non-limiting embodiments or aspects, query device 106 may include at least one processor (e.g., a multi-core processor) such as a graphics processing unit (GPU), a central processing unit (CPU), an accelerated processing unit (APU), a microprocessor, and/or the like. In some non-limiting embodiments or aspects, machine learning system 104 may include at least one machine learning model. The at least one machine learning model may include at least one neural network, at least one multilayer perceptron (MLP), at least one deep neural network (DNN), at least one attention model, at least one self-attention model, at least one multi-head self-attention model, at least one transformer model, at least one vision transformer (ViT) model, at least one convolutional neural network (CNN), at least one tree model, and/or the like. In some non-limiting embodiments or aspects, machine learning models of the machine learning system 104 may be trained based on a plurality of sample(s) (e.g., data samples and/or the like), as described herein. In some non-limiting embodiments or aspects, machine learning system 104 may be used to generate (e.g., during and/or after training) a decision, as described herein. In some non-limiting embodiments or aspects, machine learning system 104 may be in communication with database 102, as described herein. In some non-limiting embodiments or aspects, machine learning system 104 may be in communication with query device 106, as described herein.

Query device 106 may include at least one computing device, as described herein. For example, query device 106 may include a computer (e.g., portable computer, non-mobile computer, and/or the like), a server (e.g., a single server), a group of servers, and/or other like devices of a user. In some non-limiting embodiments or aspects, query device 106 may include at least one processor (e.g., a multi-core processor) such as a graphics processing unit (GPU), a central processing unit (CPU), an accelerated processing unit (APU), a microprocessor, and/or the like. In some non-limiting embodiments or aspects, query device 106 may include memory, one or more storage components, one or more input components, one or more output components, and/or one or more communication interfaces, as described herein.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Referring to FIG. 2, the system 100 is shown for analyzing and/or improving machine learning models according to some non-limiting embodiments or aspects. The system 100 may comprise the query device 106 in communication with the machine learning system 104. The query device 106 may submit a query message to the machine learning system 104. The machine learning system 104 may process the query message and return a query response containing an answer to the query message. In some non-limiting embodiments or aspects, the machine learning system 104 may be a black box model that returns an answer to the query message without providing a user interpretable reason for the answer. The machine learning system 104 may be an of the previously mentioned types machine learning models (e.g., at least one neural network, at least one multilayer perceptron (MLP), at least one deep neural network (DNN), at least one attention model, at least one self-attention model, at least one multi-head self-attention model, at least one transformer model, at least one vision transformer (ViT) model, at least one convolutional neural network (CNN), at least one tree model, and/or the like).

The machine learning system 104 may be trained on a data set comprising data records of data relevant to an entity associated with the query, such as historical data relevant to the entity associated with query. The machine learning system 104 may be trained on a data sets comprising data records of data relevant to a plurality of entities associated with queries, such as historical data relevant to the entities associated with queries. The data may comprise multivariate time-series data associated with the entities, the multivariate time-series data comprising data elements based on a time sequence for a plurality of variables. The multivariate time-series data may be unlabeled and/or labeled data, and the machine learning system 104 may be an unsupervised and/or supervised machine learning model.

The machine learning system 104 may generate an answer in return to the query message based on the data on which it was trained and on the parameters in the query message. The machine learning system 104 may be trained and/or improved using active learning system 108. Active learning system 108 may be a component of the machine learning system 104 or may be a system separate from the machine learning system 104. The active learning system 108 may continuously or periodically train and/or improve the machine learning system 104.

Given an entity set $E=\{E1, E2, \ldots, E_n\}$ where each entity represents a multivariate time-series data (e.g., $E_i = [x_{i1}, x_{i2}, \ldots, x_{it}]$), the machine learning system 104 (decision system (D)) may generate a decision $d_{it}$ for each entity and timestamp. The machine learning system 104 (and/or the active learning system 108) may also generate a user set $U=\{U_1, U_2, \ldots, U_n\}$ and interest label (Y), where an aim of the active learning system 108 may be to learn a function $\hat{F}$: E,D→Y, that approximates the expertise of users to a timestamp of an entity.

The active learning system 108 may train and/or improve the machine learning system 104 using a plurality of machine learning models. The active learning system 108 may be trained using the data set comprising data records of data relevant to the plurality of entities associated with the queries (or a portion thereof). The active learning system 108 may be trained or re-trained on different or additional data, such as the feedback data described hereinafter.

With continued reference to FIG. 2, the active learning system 108 may analyze data to train and/or improve the machine learning system 104 by receiving the data set comprising the data records associated with the entities. The active learning system 108 may also receive query messages and corresponding query responses, in order to evaluate the machine learning system's 104 performance in answering the queries and to improve future queries answered by the machine learning system 104. The active learning system 108 may receive the query messages and corresponding query responses continuously, such as in real-time relative to the query response being returned, and/or the active learning system 108 may receive the query messages and corresponding query responses periodically. The active learning system 108 may receive all query messages and corresponding query responses processed by the machine learning system 104. The active learning system 108 may receive a subset of all query messages and corresponding query responses processed by the machine learning system 104, such as a subset of query messages and corresponding query responses for which a confidence score of the machine learning system 104 does not satisfy a threshold.

With continued reference to FIG. 2, the active learning system 108 may comprise a plurality of machine learning models, including an entity embedder 110, a user embedder 112, a feature generator 114, and a recommender 116. In the non-limiting example of FIG. 2, the output of the entity embedder 110 may be an input to the user embedder 112, the output of the user embedder 112 may be an input to the feature generator 114, and an output of the feature generator 114 may be an input to the recommender 116. However, it will be appreciated that the an output of any of the machine learning models of the active learning system 108 may be an input to any of the other machine learning models of the active learning system 108. Moreover, a plurality of outputs of different machine learning models may be an input to another of the machine learning models. As one non-limiting example, outputs of one or more of the entity embedder 110, user embedder 112, and feature generator 114 may be a direct input to the recommender 116.

Moreover, an output of any of the machine learning models of the active learning system 108 may be a direct or indirect input to another of the machine learning models of the active learning system 108. By a "direct input", it is meant that the output of a first machine learning model is input to a second machine learning models without first substantively changing the data (e.g., excluding non-substantive formatting changes). By an "indirect input", it is meant that the output of a first machine learning model is input to a second machine learning models after the output has undergone a substantive processing change from some other component. An example of an indirect input would be the output of the first machine learning model being directly input to a third machine learning model, and the output of the third machine learning model being directly input to the second machine learning model.

With continued reference to FIG. 2, the active learning system 108 may analyze data to train and/or improve the machine learning system 104 by the active learning system 108 receiving the data set comprising the data records associated with the entities and/or historical query messages and corresponding query responses and inputting said data to the entity embedder 110. The entity embedder 110 may be pre-trained on this data in order to analyze subsequent query message-query response pairs. In response to receiving a query message-query response pair to be analyzed by the active learning system 108, the pre-trained entity embedder 110 may automatically generate a plurality of first embedding vectors (also referred to as "entity embedding vectors") associated with the entity associated with the query message-query response pair. The entity embedder 110 may comprise an unsupervised multivariate time-series embedder to represent the entity's time series data.

The output of the entity embedder 110 may be an embedding $h_{it}$ of entity $E_{it}$ according to Equation (1):

$$h_{it} = S([x_{i(t-\tau)}; \ldots ; x_{it}]) \tag{1}$$

where S is an unsupervised multi-variate time-series embedder, $x_{it}$ is multivariate time-series data for $E_{it}$, $\tau$ is the last timestamp, and [•;•] is the row concatenation operator.

Figure 3:
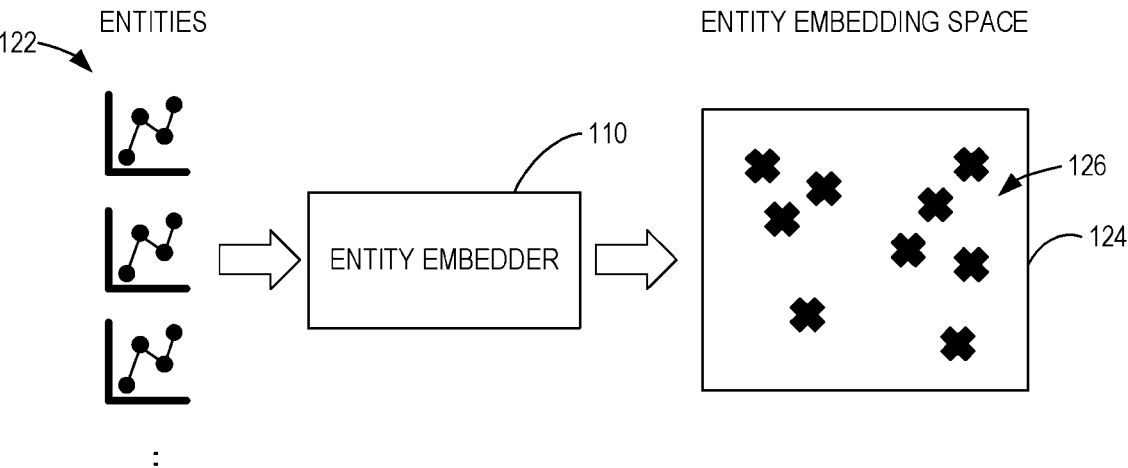
FIG. 3 is a schematic diagram of a system for generating entity embeddings, according to some non-limiting embodiments or aspects.

Referring to FIG. 3, a schematic diagram of a system for generating entity embeddings is shown according to some non-limiting embodiments or aspects. As shown in FIG. 3, entity multivariate time-series data 122 may be input to the entity embedder 110. In response to receiving the multivariate time-series data 122, the entity embedder 110 may automatically generate entity embeddings 126 in an entity embedding space 124 (e.g., an h-dimensional space).

Referring again to FIG. 2, the entity embedder 110 may input (directly or indirectly) the entity embedding vectors to the user embedder 112. The user embedder 112 may, in response, automatically generate second embedding vectors (also referred to as "user embedding vectors") by mapping each respective entity embedding vector of the plurality of entity embedding vectors to a respective user embedding vector in a user-specific embedding space associated with a user. The user may correspond to a user providing feedback data to the active learning system 108 as described herein.

The entity embedding space 124 (from FIG. 3) may not be representative of the expertise of the users of a plurality of users, whereas the user-specific embedding space may be used to distinguish between relevant or irrelevant entities to the users.

The output of the user embedder 112 may be a user embedding $$h_{it}^A$$

for User A according to Equation (2):

$$h_{it}^A = g_A(h_{it}) \tag{2}$$

where g is the user embedding mapper, where g can be designed for any function, such as the identity or neural networks.

Figure 4:
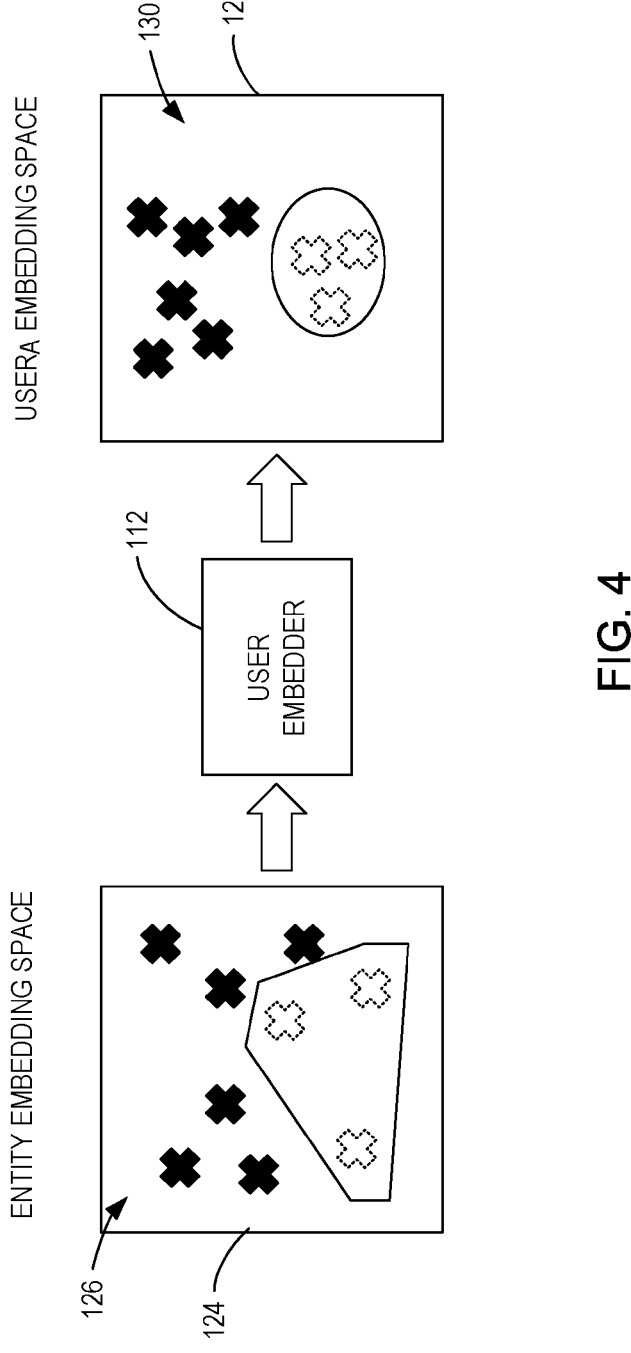
FIG. 4 is a schematic diagram of a system for generating user embeddings, according to some non-limiting embodiments or aspects.
Figure 5:
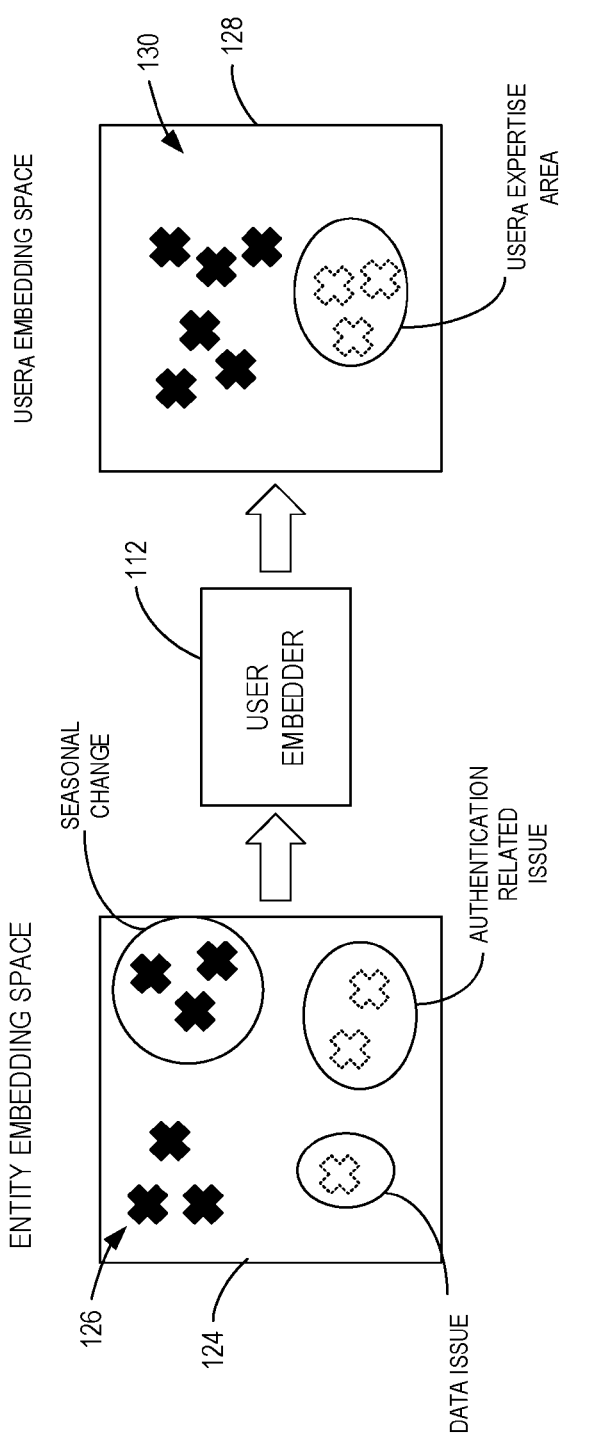
FIG. 5 is a schematic diagram of a system for generating user embeddings, according to some non-limiting embodiments or aspects.

Referring to FIGS. 4-5, schematic diagrams of a system for generating user embeddings are shown according to some non-limiting embodiments or aspects. As shown in FIGS. 4-5, the output from the entity embedder 110 (e.g., the entity embeddings 126 in an entity embedding space 124) may be input to the user embedder 112. The user embedder 112 may automatically generate user embeddings 130 in a user embedding space 128 (for User A in this particular example).

Benefits of the user embedder 112 is illustrated further in FIGS. 4-5, particularly in the event that the active learning system 108 is applied to an anomaly detection problem. The user embedding space 128 may map embedding vectors more relevant to a user (e.g., User A) in closer proximity to one another. In the entity embedding space 124, the light embedding vectors (light X's) may be the vectors most relevant to User A, but the entity embedding space 124 may not be designed to group those vectors most relevant to User A proximate to one another, but application of the user embedder 112 may cluster those more relevant embedding vectors more proximate to one another.

FIG. 5 is similar to FIG. 4, but non-limiting examples of labels of clusters are provided. The entity embedding space 124 may group related entities together. For example, the entities may be merchants involved in payment transactions, types of anomalous behavior, and/or the like. The non-limiting example of FIG. 5 has the entity embedding space 124 grouping the entities together based on types of anomalous behavior (e.g., data issues, authentication-related issues, seasonal changes, and the like). While the entity embedding space 124 may be configured to group related entities together, the user may be trained in different and/or unrelated entities. Therefore, the user embedder 112 may regroup embedding vectors (e.g., as user embedding vectors) in the user embedding space 128. FIG. 5 shows how the light embedding vectors (light X's) are now grouped by the user embedder 112 in the user embedding space 128 as related embeddings vectors, forming a cluster related as being within User A's area of expertise.

In some non-limiting embodiments or aspects, the user embedder 112 may comprise a user embedding mapper layer. The user embedding mapper layer may comprise at least one of the following: an identity, linear, non-linear, non-linear-2 (2 non-linear layers), or any combination thereof user embedding mapper layer. The identity layer may return the same embedding space and the non-linear layers may use a sigmoid activation. The user embedding mapper layer may comprise a linear user embedding mapper layer.

Referring again to FIG. 2, the user embedder 112 may input (directly or indirectly) the user embedding vectors to the feature generator 114. The feature generator 114 may, in response, automatically extract feature data associated with at least one feature based on the plurality of user embedding vectors.

In some non-limiting embodiments or aspects, the active learning system 108 may not have training data associated with the users (e.g., through an initial survey of the users, or the like). The feature generator 114 may extract features from the user embedding space, and these features may be learned or designed for a specific application. As one non-limiting example, an expert-designed feature for anomaly applications can be the average distance from one item to other items, which will likely be higher for anomaly cases. However, learned features may be shown as more expressive than expert-designed features because there may be challenges in designing or engineering all useful features. Thus, the feature generator 114 may be a function layer on top of the user embedder 112 so that it will learn new features from $$h_{it}^A.$$

The output of the feature generator 114 may be feature data $$h_{it}'^A$$

for User A according to Equation (3):

$$h_{it}'^A = f\left(h_{it}^A\right) \tag{3}$$

where h' has a smaller dimension than h, and f is a feature extractor function. In some non-limiting embodiments or aspects, f may also represent a set of learned or expert-designed functions, in which case h' may be a concatenation of extracted features.

With continued reference to FIG. 2, the feature generator 114 may input (directly or indirectly) the feature data to the recommender 116 to generate the relevance score for each entity of the plurality of entities. In some non-limiting embodiments or aspects, at least one of the following: an output from a machine learning system 104 (e.g., $d_{it}$), the plurality of entity embedding vectors (e.g., $h_{it}$), the plurality of user embedding vectors (e.g., $$h_{it}^A),$$

the feature data (e.g., $$h_{it}'^A),$$

or any combination thereof may be input (directly or indirectly) to the recommender 116 to generate the relevance score for each entity of the plurality of entities.

In some non-limiting embodiments or aspects, the plurality of user embedding vectors and the feature data may be input to the recommender 116 to generate the relevance score for each entity of the plurality of entities.

In some non-limiting embodiments or aspects, the output of the machine learning system 104 and the feature data may be input to the recommender 116 to generate the relevance score for each entity of the plurality of entities.

In some non-limiting embodiments or aspects, the output of the machine learning system 104 may be input to the recommender 116 to generate the relevance score for each entity of the plurality of entities.

In some non-limiting embodiments or aspects, the plurality of entity embedding vectors may be input to the recommender 116 to generate the relevance score for each entity of the plurality of entities.

In some non-limiting embodiments or aspects, the plurality of user embedding vectors may be input to the recommender 116 to generate the relevance score for each entity of the plurality of entities.

In some non-limiting embodiments or aspects, the feature data may be input to the recommender 116 to generate the relevance score for each entity of the plurality of entities.

In response to receiving the input, the recommender 116 may automatically generate a relevance score for each entity of the plurality of entities. The relevance score may quantify each entity's relevance to a user (e.g., User A).

In some non-limiting embodiments or aspects, the output of the recommender 116 may be relevance score $$r_{it}^A$$

for entity $E_{it}$ for User A according to Equation (4):

$$r_{it}^A = w_1 \odot d_{it} + \Sigma W \odot h_{it}'^A \tag{4}$$

where the relevance score is for entity i to User A at time t, where $w_1$ and W are learned weights. These weights may represent the importance of the output of the decision system (e.g., machine learning system 104) and extracted features to different users.

In some non-limiting embodiments or aspects, the output of the machine learning system 104 ($d_{it}$) may be used to determine the relevance score. Even though $d_{it}$ may not be fully correct, it can be incorporated into the relevance score calculation to ease the cold-start problem.

Based on the relevance scores generated by the recommender 116, the recommender may determine a subset of entities Q. The entities may comprise the entities whose relevance score indicates a highest relevance to the user (e.g., User A). For example, Q may contain a predetermined number of entities (e.g., the 10 most relevant entities). For example, Q may contain all entities having a relevance score satisfying a predetermined relevance threshold (e.g., entities having a highest or lowest relevance score).

Each user may comprise a capacity representing a number of entities for which that user is capable of providing feedback for in a given time period. The quantity of entities in subset Q may be based on the capacity of the user, such as the quantity of entities in subset Q being equal to or less than the capacity for the user during the time period.

With continued reference to FIG. 2, the recommender 116 may generate a feedback request containing the subset of entities. The recommender 116 may communicate the feedback request to a user device 118 of the user. For example, the user device 118 may be associated with User A, and the feedback request may contain the subset of entities the recommender 116 determined to be most relevant to User A.

Figure 6:
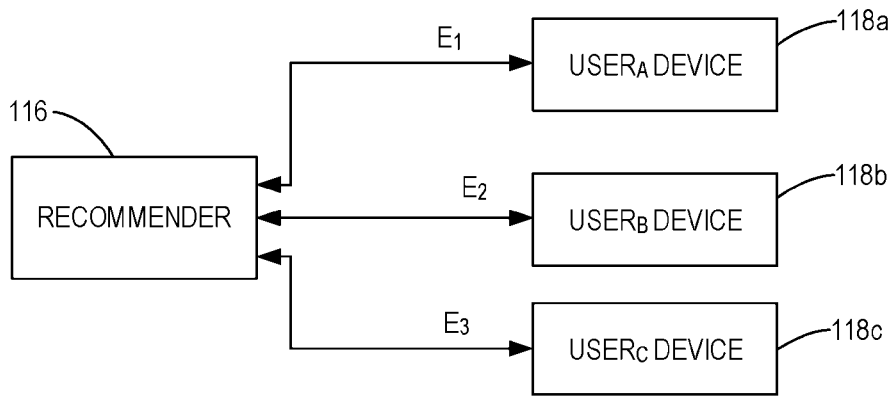
FIG. 6 is a schematic diagram of a system for submitting a feedback request, according to some non-limiting embodiments or aspects.

Referring to FIGS. 2 and 6, systems communicating feedback requests to user devices 118, 118a, 118b, 118c are shown. The recommender 116 may communicate a first feedback request to User A device 118a that contains a first entity ($E_1$) determined by the recommender 116 to be relevant to User A. The recommender 116 may communicate a second feedback request to User B device 118*b* that contains a second entity ($E_2$) determined by the recommender 116 to be relevant to User B. The recommender 116 may communicate a third feedback request to User C device 118*c* that contains a third entity ($E_3$) determined by the recommender 116 to be relevant to User C.

Referring again to FIG. 2, in response to receiving the feedback request, the user device 118 may generate feedback data. To generate the feedback data, the user device 118 may display at least one user interface associated with an entity contained in the feedback request for which feedback data is requested.

In some non-limiting embodiments or aspects, the user device 118 may display a first user interface configured to receive data from the user associated with whether the user agrees with decision of the machine learning system 104 for the entity. The user may input an answer as to whether the machine learning system 104 made the correct decision for the entity (e.g., a "yes" or "no" indicator). The user may additionally or alternatively provide the answer the user thinks should have been made for the entity, which can then be compared with the answer from the machine learning system 104 to determine whether the user agrees with the machine learning system 104.

In some non-limiting embodiments or aspects, the user device 118 may display a second user interface (the same or separate from the first user interface) configured to receive data from the user associated with whether the user has expertise for this entity. For example, the user may input a binary answer, such as that the user does or does not have expertise for this entity. Additionally or alternatively, the user may provide a non-binary answer specifying the degree of expertise the user has for the entity (e.g., a scaled 1-10 score of how strong the user's expertise is for the entity).

Therefore, the user device 118 may receive input from the user about what the user indicates the decision for the entity should be (and/or whether that decision agrees with the machine learning system 104) ("Type 1 data") and the user's level of expertise for the entity ("Type 2 data"). These responses may comprise binary classifications of the user's response and/or non-binary classifications of the user's response. Similar data may be received from the user for each entity contained in the feedback request.

The user device 118 may generate feedback data based on the user's input to the user interfaces. The user device 118 may communicate this feedback data to the database 102, and the database 102 may store this feedback data. Prior to the feedback data being communicated to the active learning system 108 and/or the machine learning system 104, a label generator 120 may generate labels and associate the labels with the feedback data. The labels may be configured to enable the active learning system 108 and/or the machine learning system 104 to learn from the generated feedback data.

With continued reference to FIG. 2, the feedback data may be communicated to the active learning system 108 and/or the machine learning system 104 to train and/or improve the same. At least one of the following: the machine learning system 104, the entity embedder 110, the user embedder 112, the feature generator 114, the recommender 116, or any combination thereof may be trained based on the feedback data, such as by inputting the feedback data thereto.

In some non-limiting embodiments or aspects, training the at least one of the following: the machine learning system 104, the entity embedder 110, the user embedder 112, the feature generator 114, the recommender 116, or any combination thereof may comprise modifying at least one parameter of at least one of the following: the machine learning system 104, the entity embedder 110, the user embedder 112, the feature generator 114, the recommender 116, or any combination thereof based on the feedback data.

For example, Type 1 data from the feedback data may be input to the machine learning system 104 to train and/or improve the machine learning system 104, which may learn improved decisions based on the expert user's answer about what a decision should have been in the feedback data.

For example, Type 2 data from the feedback data may be input to at least one of the following: the entity embedder 110, the user embedder 112, the feature generator 114, the recommender 116, or any combination thereof to train and/or improve the models, which may learn improved decisions about which user device to submit the feedback request based on the expert user's indication of their expertise for the entity in the feedback data.

In some non-limiting embodiments or aspects, training the at least one of the following: the machine learning system 104, the entity embedder 110, the user embedder 112, the feature generator 114, the recommender 116, or any combination thereof may comprise automatically determining (e.g., by the machine learning system 104, the entity embedder 110, the user embedder 112, the feature generator 114, or the recommender 116, or some other component) a loss based on the feedback data and a loss function. The at least one of the following: the machine learning system 104, the entity embedder 110, the user embedder 112, the feature generator 114, the recommender 116, or any combination thereof may be trained based on the loss.

In some non-limiting embodiments or aspects, the loss function used to determine the loss may comprise at least one of the following: a first component to widen a gap between pairs of entities of the subset of entities having feedback data associated with a correct relative ranking between entities of each pair of entities based on the relevance scores thereof; a second component configured to narrow a gap between pairs of entities of the subset of entities having feedback data associated with an incorrect relative ranking between entities of each pair of entities based on the relevance scores thereof; a third component configured to narrow a gap between entities of the subset of entities having feedback data associated with an incorrect relative ranking between the entities of the subset of entities and other entities of the plurality of entities not included in the subset of entities, or any combination thereof.

For example, the first component may widen the gap between correctly ranked positive and negative samples (e.g., where the user feedback data matches the decisions of the machine learning system 104 and/or the recommender 116).

For example, the second component may narrow the gap between incorrectly ranged positive and negative samples (e.g., where the user feedback data does not match the decisions of the machine learning system 104 and/or the recommender 116).

For example, the third component may recover unrecommended samples by narrowing the gap between incorrectly recommended samples and unrecommended samples (e.g., where the user feedback data indicates that the sample should not have been recommended and there are other samples that were not recommended by the recommender 116).

It will be appreciated that these three components are for example purposes only and more or fewer components may be used in the loss function.

In some non-limiting embodiments or aspects, the loss function may be determined as follows. For each timestamp t, the system may train with the objective to improve relevance scores of entities $$R_t^A = [r_{1t}^A, \dots, r_{nt}^A]$$

based on the expertise information array $$E_t^A = [e_{1t}^A, \dots, e_{Qt}^A].$$

The loss function may be expressed according to Equation (5):

$$\max L_{ALL}(E_t^A, R_t^A) = \hspace{2cm} (5)$$

$$x_1 * \sum_{i<Q} \sum_{Q>j>i} \sigma(r_{it}^A - r_{jt}^A) \rightarrow L_{WIDEN} \text{ (Component 1)}$$

$$e_{it}^A = 1 e_{jt}^A = 0 + x_2 * \sum_{i<Q} \sum_{j<i} \sigma(r_{it}^A - r_{jt}^A) \rightarrow L_{NARROW} \text{ (Component 2)}$$

$$e_{it}^A = 1 e_{jt}^A = 0 + x_3 * \sum_{j<Q} \sum_{K \geq Q} \sigma(r_{kt}^A - r_{jt}^A) \rightarrow L_{RECOVER} \text{ (Component 3)}$$

$$e_{it}^A = 1$$

where $L_{WIDEN}$ widens the gap between correctly ranked positive and negative samples, $L_{NARROW}$ narrows the gap between wrongly ranked positive and negative samples, and $L_{RECOVER}$ recovers unrecommended samples by narrowing the gap between wrongly recommended samples and unrecommended samples.

$$R_t^A$$

are sorted relevance scores for user A at time t generated by the algorithm.

$$E_t^A$$

are binary expertise information array for Q entities at time t from user A. Parameters $x_1$, $x_2$, and $x_3$ are tunable hyperparameters for each component to value each different loss function term respectively, which can be optimized based on the scenario and the needs of the application, and $\sigma$ is an activation function.

At least one of the following: the machine learning system 104, the entity embedder 110, the user embedder 112, the feature generator 114, the recommender 116, or any combination thereof may be trained by maximizing the loss function (e.g., $\max L_{ALL}$ $$(E_t^A, R_t^A)).$$

Figure 7:
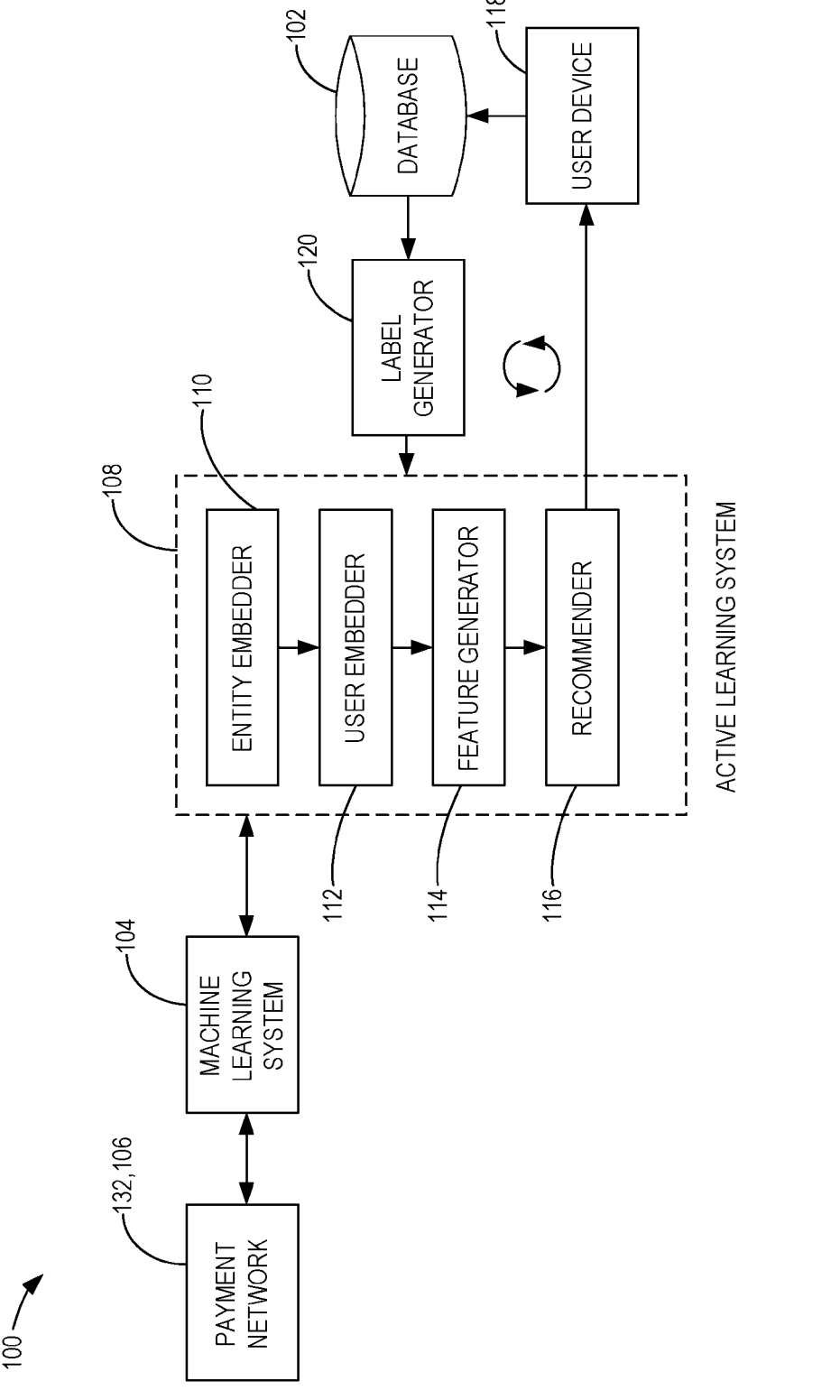
FIG. 7 is a schematic diagram of an example system for analyzing and/or improving machine learning models for a payment network, according to some non-limiting embodiments or aspects.

Referring to FIG. 7, an example system 100 is shown for analyzing and/or improving machine learning models for a payment network 132. FIG. 2 is identical to FIG. 7 except that FIG. 7 provides a non-limiting example of the query device 106 comprising the payment network 132. However, it will be appreciated that application of the system 100 in FIG. 2 is not limited to the specific query device 106 (e.g., payment network 132) shown in FIG. 7, and the system may be used for any other suitable application.

Figure 8:
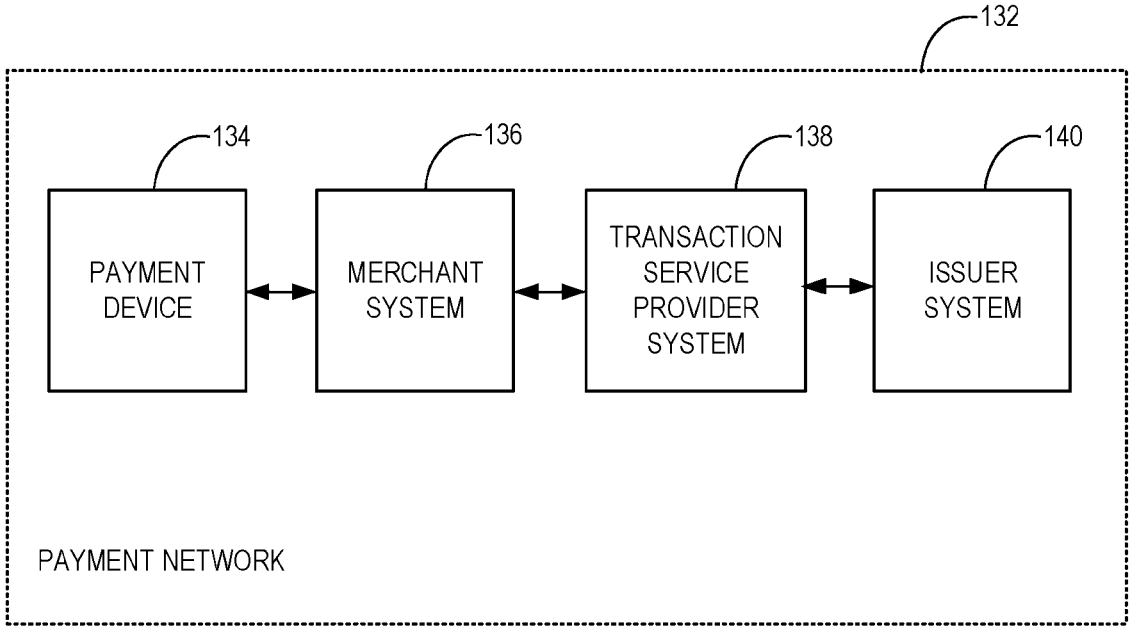
FIG. 8 is a schematic diagram of the payment network of FIG. 7, according to some non-limiting embodiments or aspects.

With continued reference to FIG. 7 and referring to FIG. 8, the query device 106 may comprise the payment network 132. The payment network 132 may comprise a payment device 134, a merchant system 136, a transaction service provider system 138, and an issuer system 140. The payment network 132 may process electronic payment transactions as follows.

A consumer may initiate an electronic payment transaction with the merchant system 136 of a merchant using the payment device 134. The merchant system 136 may generate and transmit a transaction request to the transaction service provider system 138 (of a transaction service provider associated with the payment device 134), and the transaction request may include payment device data (e.g., PAN, expiration date, cvv code, and the like) and transaction data (e.g., price, merchant identifier, merchant category code, and the like). The transaction service provider system 138 may generate and transmit an authorization request to the issuer system 140 (of an issuer system associated with the payment device 134), and the authorization request may include at least a portion of the data contained in the transaction request. The issuer system 140 may generate an authorization decision for the electronic payment transaction, such as that the transaction is authorized, authorized-in-part, or declined. The issuer system 140 may generate and transmit an authorization response to the transaction service provider system 138, the authorization response containing the authorization decision. The transaction service provider system 138 may generate and transmit a transaction response to the merchant system 136, the transaction response containing the authorization decision. The merchant system 136 may automatically initiate further processing of the electronic payment transaction based on the authorization decision. For example, the merchant system 136 may automatically terminate the transaction if the authorization decision is to decline the transaction. For example, the merchant system 136 may automatically initiate processing of the payment transaction to completion if the authorization decision is to decline the transaction. The payment network 132 may authorize, clear, and settle transactions. The payment network 132 may store transaction data (also referred to herein as "historical transaction data") associated with electronic payment transactions processed thereby. The historical transaction data may comprise multivariate time-series data associated with the electronic payment transactions.

With continued reference to FIG. 7, in some non-limiting embodiments or aspects, the payment network 132 may transmit a query request to the machine learning system 104 to request at least one of the following: an authorization decision, a fraud determination, a credit application decision, an insurance application decision, other type of transaction-related decision, or any combination thereof. The machine learning system 104 may generate at least one of the foregoing decisions by analyzing the historical transaction data (and/or historical credit application data or historical insurance application data). The machine learning system 104 many return a query response to the payment network 132 comprising its decision. The payment network 132 may further process the transaction based on the query response.

The machine learning system 104 may be trained using the active learning system 108 as previously described herein. The machine learning system 104 may be continuously trained as further historical transaction data is generated by the payment network 132 and/or feedback data from the active learning system 108, and/or the machine learning system 104 may be periodically trained on further historical transaction data is generated by the payment network 132 and/or feedback data from the active learning system 108. The machine learning system 104 and/or the active learning system 108 may re-evaluate a particular transaction using the user device 118 as previously described herein based on a request from the payment network 132 and/or based on a confidence score generated by the machine learning system 104 for the particular payment transaction not satisfying a threshold.

With continued reference to FIG. 7, the active learning system 108 may train the machine learning system 104 for transactions processed by the payment network 132 using the data set comprising the plurality of data records associated with an entity of a plurality of entities comprising the historical transaction data generated and/or processed by the payment network 132. Therefore, the historical transaction data may be input to at least one of the following: the entity embedder 110, user embedder 112, feature generator 114, recommender 116, or any combination thereof of the active learning system 108.

Referring now to FIG. 9, shown is a process 200 for analyzing and/or improving machine learning models, according to some non-limiting embodiments or aspects. The steps shown in FIG. 9 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. In some non-limiting embodiments or aspects, one or more of the steps of process 200 may be performed (e.g., completely, partially, and/or the like) by active learning system 108 (e.g., one or more devices of active learning system 108). In some non-limiting embodiments or aspects, one or more of the steps of process 200 may be performed (e.g., completely, partially, and/or the like) by another system, another device, another group of systems, or another group of devices, separate from or including active learning system 108.

As shown in FIG. 9, at step 202, process 200 may include receiving a data set. For example, active learning system 108 may receive a data set comprising a plurality of data records, each data record of the plurality of data records associated with an entity of a plurality of entities.

In some non-limiting embodiments or aspects, the data set may comprise multivariate time-series data comprising the plurality of data records, each respective data record of the plurality of data records comprising data elements based on a time sequence for a plurality of variables.

In some non-limiting embodiments or aspects, the data set may comprise transaction data associated with a plurality of transactions, each data record associated with at least one transaction of the plurality of transactions.

As shown in FIG. 9, at step 204, process 200 may include inputting the data set to a pre-trained first machine learning model. For example, active learning system 108 may input the data set to a pre-trained first machine learning model (e.g., entity embedder 110) to generate a plurality of first embedding vectors, each respective first embedding vector of the plurality of first embedding vectors associated with a respective entity of the plurality of entities.

As shown in FIG. 9, at step 206, process 200 may include inputting the first embedding vectors to a second machine learning model. For example, active learning system 108 (e.g., entity embedder 110 thereof) may input the plurality of first embedding vectors to a second machine learning model (e.g., user embedder 112) to generate a plurality of second embedding vectors by mapping each respective first embedding vector of the plurality of first embedding vectors to a respective second embedding vector in a user-specific embedding space associated with a user.

As shown in FIG. 9, at step 208, process 200 may include inputting the second embedding vectors to a third machine learning model. For example, active learning system 108 (e.g., entity embedder 110 and/or user embedder 112 thereof) may input the plurality of second embedding vectors to a third machine learning model (e.g., feature generator 114) to extract feature data associated with at least one feature based on the plurality of second embedding vectors.

As shown in FIG. 9, at step 210, process 200 may include inputting the second embedding vectors and/or the feature data to a fourth machine learning model. For example, active learning system 108 (e.g., entity embedder 110 and/or user embedder 112 and/or feature generator 114 thereof) may input the plurality of second embedding vectors and the feature data to a fourth machine learning model (e.g., recommender 116) to generate a relevance score for each entity of the plurality of entities.

In some non-limiting embodiments or aspects, the relevance score may be associated with at least one of the following: an authorization decision, a fraud determination, a credit application decision, an insurance application decision, or any combination thereof.

As shown in FIG. 9, at step 212, process 200 may include determining a subset of entities. For example, active learning system 108 may determine a subset of entities of the plurality of entities based on the relevance score for each entity of the subset of entities.

In some non-limiting embodiments or aspects, the subset of entities may comprise a predetermined number of entities having one of a highest relevance score or a lowest relevance score.

As shown in FIG. 9, at step 214, process 200 may include communicating a feedback request. For example, active learning system 108 may communicate a feedback request to a user device (e.g., user device 118) of the user based on the subset of entities.

As shown in FIG. 9, at step 216, process 200 may include receiving feedback data. For example, active learning system 108 may receive feedback data from the user device (e.g., directly from user device 118 and/or indirectly via another component, such as label generator 120) for each entity of the subset of entities.

In some non-limiting embodiments or aspects, the feedback data may comprise a binary classification for each entity of the subset of entities.

As shown in FIG. 9, at step 218, process 200 may include training at least one of the machine learning models based on the feedback data. For example, active learning system 108 may train at least one of the following: the machine learning system 104, the entity embedder 110, the user embedder 112, the feature generator 114, the recommender 116, or any combination thereof based on the feedback data.

In some non-limiting embodiments or aspects, training the machine learning models may comprise modifying at least one parameter of at least one of the machine learning models based on the feedback data. The at least one parameter may include at least one weight (e.g., of a neural network), at least one element of a weight matrix (e.g., of a neural network), and/or the like.

In some non-limiting embodiments or aspects, training the machine learning models may comprise: determining, with at least one processor, a loss based on the feedback data and a loss function; and training, with at least one processor, the at least one of the machine learning models based on the loss. The loss function may comprise at least one of the following: a first component to widen a gap between pairs of entities of the subset of entities having feedback data associated with a correct relative ranking between entities of each pair of entities based on the relevance scores thereof; a second component configured to narrow a gap between pairs of entities of the subset of entities having feedback data associated with an incorrect relative ranking between entities of each pair of entities based on the relevance scores thereof; a third component configured to narrow a gap between entities of the subset of entities having feedback data associated with an incorrect relative ranking between the entities of the subset of entities and other entities of the plurality of entities not included in the subset of entities, or any combination thereof. The loss function may further comprise a first hyperparameter for the first component, a second hyperparameter for the second component, and a third hyperparameter for the third component.

Figure 10:
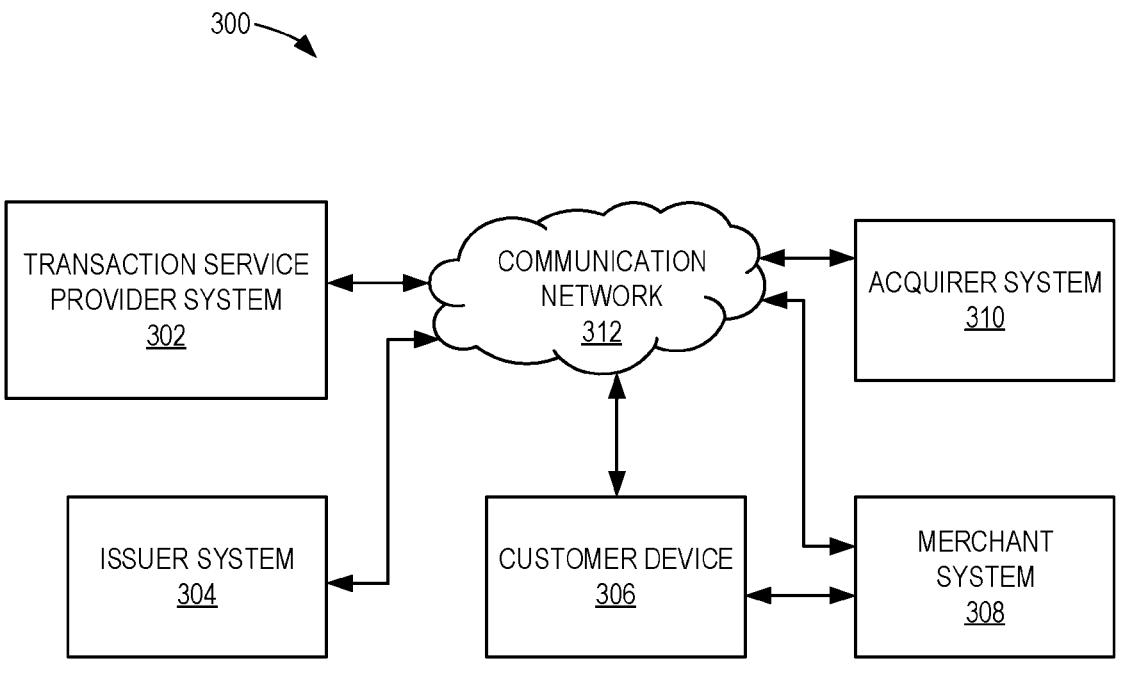
FIG. 10 is a schematic diagram of an example environment in which methods, systems, and/or computer program products, described herein, may be implemented according to some non-limiting embodiments or aspects.

Referring now to FIG. 10, FIG. 10 is a diagram of a non-limiting embodiment or aspect of an exemplary environment 300 in which systems, products, and/or methods, as described herein, may be implemented. As shown in FIG. 10, environment 300 may include transaction service provider system 302, issuer system 304, customer device 306, merchant system 308, acquirer system 310, and communication network 312. In some non-limiting embodiments or aspects, at least one of the following: database 102, machine learning system 104, query device 106, active learning system 108, entity embedder 110, user embedder 112, feature generator 114, recommender 116, user device 118, label generator 120, or any combination thereof may be implemented by (e.g., part of) transaction service provider system 302. In some non-limiting embodiments or aspects, at least one of the following: database 102, machine learning system 104, query device 106, active learning system 108, entity embedder 110, user embedder 112, feature generator 114, recommender 116, user device 118, label generator 120, or any combination thereof may be implemented by (e.g., part of) another system, another device, another group of systems, or another group of devices, separate from or including transaction service provider system 302, such as issuer system 304, customer device 306, merchant system 308, acquirer system 310, and/or the like.

Transaction service provider system 302 may include one or more devices capable of receiving information from and/or communicating information to issuer system 304, customer device 306, merchant system 308, and/or acquirer system 310 via communication network 312. For example, transaction service provider system 302 may include a computing device, such as a server (e.g., a transaction processing server), a group of servers, and/or other like devices. In some non-limiting embodiments or aspects, transaction service provider system 302 may be associated with a transaction service provider as described herein. In some non-limiting embodiments or aspects, transaction service provider system 302 may be in communication with a data storage device, which may be local or remote to transaction service provider system 302. In some non-limiting embodiments or aspects, transaction service provider system 302 may be capable of receiving information from, storing information in, communicating information to, or searching information stored in the data storage device.

Issuer system 304 may include one or more devices capable of receiving information and/or communicating information to transaction service provider system 302, customer device 306, merchant system 308, and/or acquirer system 310 via communication network 312. For example, issuer system 304 may include a computing device, such as a server, a group of servers, and/or other like devices. In some non-limiting embodiments or aspects, issuer system 304 may be associated with an issuer institution as described herein. For example, issuer system 304 may be associated with an issuer institution that issued a credit account, debit account, credit card, debit card, and/or the like to a user associated with customer device 306.

Customer device 306 may include one or more devices capable of receiving information from and/or communicating information to transaction service provider system 302, issuer system 304, merchant system 308, and/or acquirer system 310 via communication network 312. Additionally or alternatively, each customer device 306 may include a device capable of receiving information from and/or communicating information to other customer devices 306 via communication network 312, another network (e.g., an ad hoc network, a local network, a private network, a virtual private network, and/or the like), and/or any other suitable communication technique. For example, customer device 306 may include a client device and/or the like. In some non-limiting embodiments or aspects, customer device 306 may or may not be capable of receiving information (e.g., from merchant system 308 or from another customer device 306) via a short-range wireless communication connection (e.g., an NFC communication connection, an RFID communication connection, a Bluetooth® communication connection, a Zigbee® communication connection, and/or the like), and/or communicating information (e.g., to merchant system 308) via a short-range wireless communication connection.

Merchant system 308 may include one or more devices capable of receiving information from and/or communicating information to transaction service provider system 302, issuer system 304, customer device 306, and/or acquirer system 310 via communication network 312. Merchant system 308 may also include a device capable of receiving information from customer device 306 via communication network 312, a communication connection (e.g., an NFC communication connection, an RFID communication connection, a Bluetooth® communication connection, a Zigbee® communication connection, and/or the like) with customer device 306, and/or the like, and/or communicating information to customer device 306 via communication network 312, the communication connection, and/or the like. In some non-limiting embodiments or aspects, merchant system 308 may include a computing device, such as a server, a group of servers, a client device, a group of client devices, and/or other like devices. In some non-limiting embodiments or aspects, merchant system 308 may be associated with a merchant as described herein. In some non-limiting embodiments or aspects, merchant system 308 may include one or more client devices. For example, merchant system 308 may include a client device that allows a merchant to communicate information to transaction service provider system 302. In some non-limiting embodiments or aspects, merchant system 308 may include one or more devices, such as computers, computer systems, and/or peripheral devices capable of being used by a merchant to conduct a transaction with a user. For example, merchant system 308 may include a POS device and/or a POS system.

Acquirer system 310 may include one or more devices capable of receiving information from and/or communicating information to transaction service provider system 302, issuer system 304, customer device 306, and/or merchant system 308 via communication network 312. For example, acquirer system 310 may include a computing device, a server, a group of servers, and/or the like. In some non-limiting embodiments or aspects, acquirer system 310 may be associated with an acquirer as described herein.

Communication network 312 may include one or more wired and/or wireless networks. For example, communication network 312 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 10 are provided as an example. There may be additional systems, devices, and/or networks; fewer systems, devices, and/or networks; different systems, devices, and/or networks; and/or differently arranged systems, devices, and/or networks than those shown in FIG. 10. Furthermore, two or more systems or devices shown in FIG. 10 may be implemented within a single system or device, or a single system or device shown in FIG. 10 may be implemented as multiple, distributed systems or devices. Additionally or alternatively, a set of systems (e.g., one or more systems) or a set of devices (e.g., one or more devices) of environment 300 may perform one or more functions described as being performed by another set of systems or another set of devices of environment 300.

Figure 11:
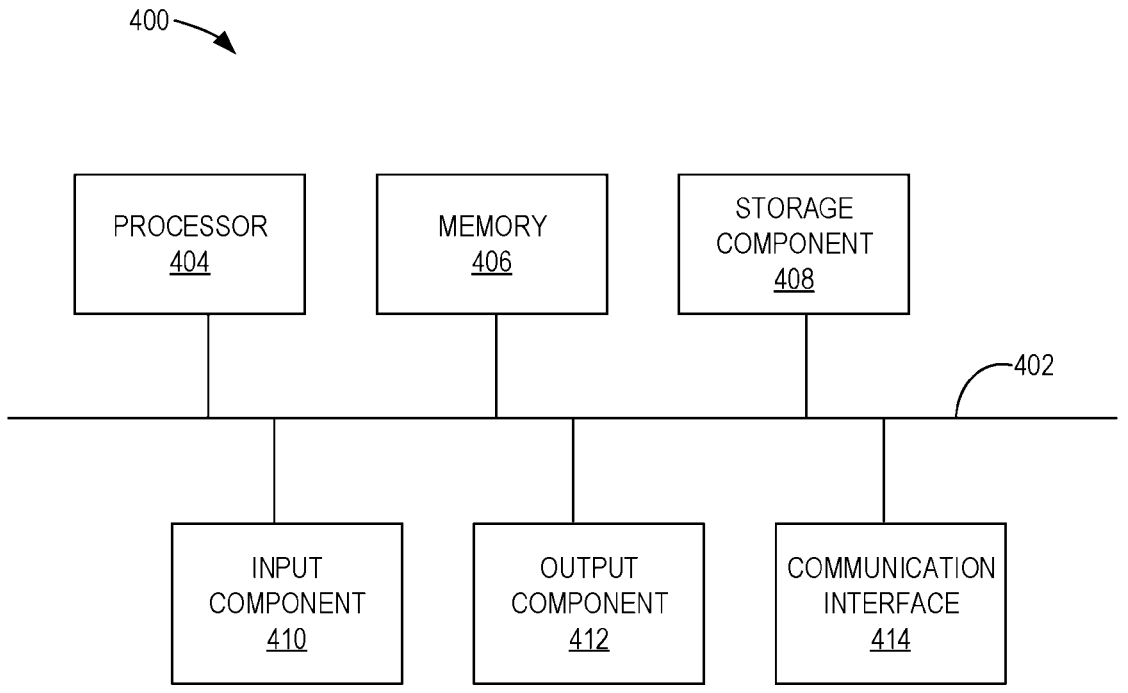
FIG. 11 is a schematic diagram of example components of one or more devices of FIGS. 1-8 and/or FIG. 10 according to some non-limiting embodiments or aspects.

Referring now to FIG. 11, shown is a diagram of example components of a device 400 according to non-limiting embodiments or aspects. Device 400 may correspond to at least one of the following: database 102, machine learning system 104, and/or query device 106 in FIG. 1, and/or database 102, machine learning system 104, and/or query device 106 active learning system 108, entity embedder 110, user embedder 112, feature generator 114, recommender 116, user device 118, and/or label generator 120 in FIG. 2, and/or entity embedder 110 in FIG. 3, and/or user embedder 112 in FIG. 4, and/or user embedder 112 in FIG. 5, and/or recommender 116 and/or user devices 118a-c in FIG. 6, and/or database 102, machine learning system 104, query device/payment network 106/132, active learning system 108, entity embedder 110, user embedder 112, feature generator 114, recommender 116, user device 118, and/or label generator 120 in FIG. 7, and/or payment network 132, payment device 134, merchant system 136, transaction service provider system 138, and/or issuer system 140 in FIG. 8, and/or at least one of transaction service provider system 302, issuer system 304, customer device 306, merchant system 308, and/or acquirer system 310 in FIG. 10, or any combination thereof, as an example. In some non-limiting embodiments or aspects, such systems or devices in FIG. 1-8 or 10 may include at least one device 400 and/or at least one component of device 400. The number and arrangement of components shown in FIG. 11 are provided as an example. In some non-limiting embodiments or aspects, device 400 may include additional components, fewer components, different components, or differently arranged components than those shown in FIG. 11. Additionally, or alternatively, a set of components (e.g., one or more components) of device 400 may perform one or more functions described as being performed by another set of components of device 400.

As shown in FIG. 11, device 400 may include bus 402, processor 404, memory 406, storage component 408, input component 410, output component 412, and communication interface 414. Bus 402 may include a component that permits communication among the components of device 400. In some non-limiting embodiments or aspects, processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read only memory (ROM), and/or another type of dynamic or static storage device (e.g., flash memory, magnetic memory, optical memory, etc.) that stores information and/or instructions for use by processor 404.

With continued reference to FIG. 11, storage component 408 may store information and/or software related to the operation and use of device 400. For example, storage component 408 may include a hard disk (e.g., a magnetic disk, an optical disk, a magneto-optic disk, a solid state disk, etc.) and/or another type of computer-readable medium. Input component 410 may include a component that permits device 400 to receive information, such as via user input (e.g., a touch screen display, a keyboard, a keypad, a mouse, a button, a switch, a microphone, etc.). Additionally, or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.). Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium may include any non-transitory memory device. A memory device includes memory space located inside of a single physical storage device or memory space spread across multiple physical storage devices. Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

In some non-limiting embodiment or aspects, a computer program product for analyzing and/or improving machine learning models includes at least one non-transitory computer readable medium including program instructions that, when executed by at least one processor, cause the at least one processor to execute one of the previously-described methods. The at least one processor may include any of the components shown in FIG. 1-8 or 10 (e.g., database 102, machine learning system 104, query device 106, active learning system 108, entity embedder 110, user embedder 112, feature generator 114, recommender 116, user device 118, label generator 120, payment network 132, payment device 134, merchant system 136, transaction service provider system 138, issuer system 140, transaction service provider system 302, issuer system 304, customer device 306, merchant system 308, acquirer system 310, and the like).

For the purpose of illustration, the effectiveness of an example system according to the present disclosure is compared to existing systems to show the effectiveness of the present disclosure. A public data set containing 38 time-series data of various lengths was used in these examples. The data was chunked into 100 time series (entities) with a length of 365. Each time series consisting of 38 different features.

The following systems were used in these examples:
1. Random (Comparative)—makes a random recommendation in the recommender step to the user.
2. AI Decision System (Comparative)—uses on an artificial intelligence (AI) system probability to recommend entities to users.
3. Random Forest Active Learner (Comparative)—combines uncertainty and confidence scores for each entity and recommends them to the user. This model is trained with active learning using the same experimental settings as the Feedback Loop Active Learner (FLAL).
4. Feedback Loop Active Learner (FLAL) (According to the Present Disclosure)—the system described by the present disclosure, such as is embodied in FIG. 2.

For FLAL, the user embedding mapper was selected as a linear layer as a result of an ablation study described hereinafter. The feature generator generated 15 learned features with the linear layer, and the recommender also used a linear layer to generate the relevance score for an entity. To simulate user feedback, ground truth information for the data set was used. The hyperparameters were tuned to optimize the model using Adam optimizer with a learning rate of 0.0001, L2 normalization weight on model weights 0.001. Loss function weights $x_1$, $x_2$, and $x_3$ were selected from {0.0, 0.5, 1.0}. In these examples, $\tau$ is set to 127, and the embedding size d is 128. Q is set to 10 and 20 for different runs. The number of recommended items is also set to Q. Since the real evaluation can only consider feedback from the recommended entities, the examples compare precision metrics. At each round, precision@Q and average precision@Q is calculated.

Figure 12A:
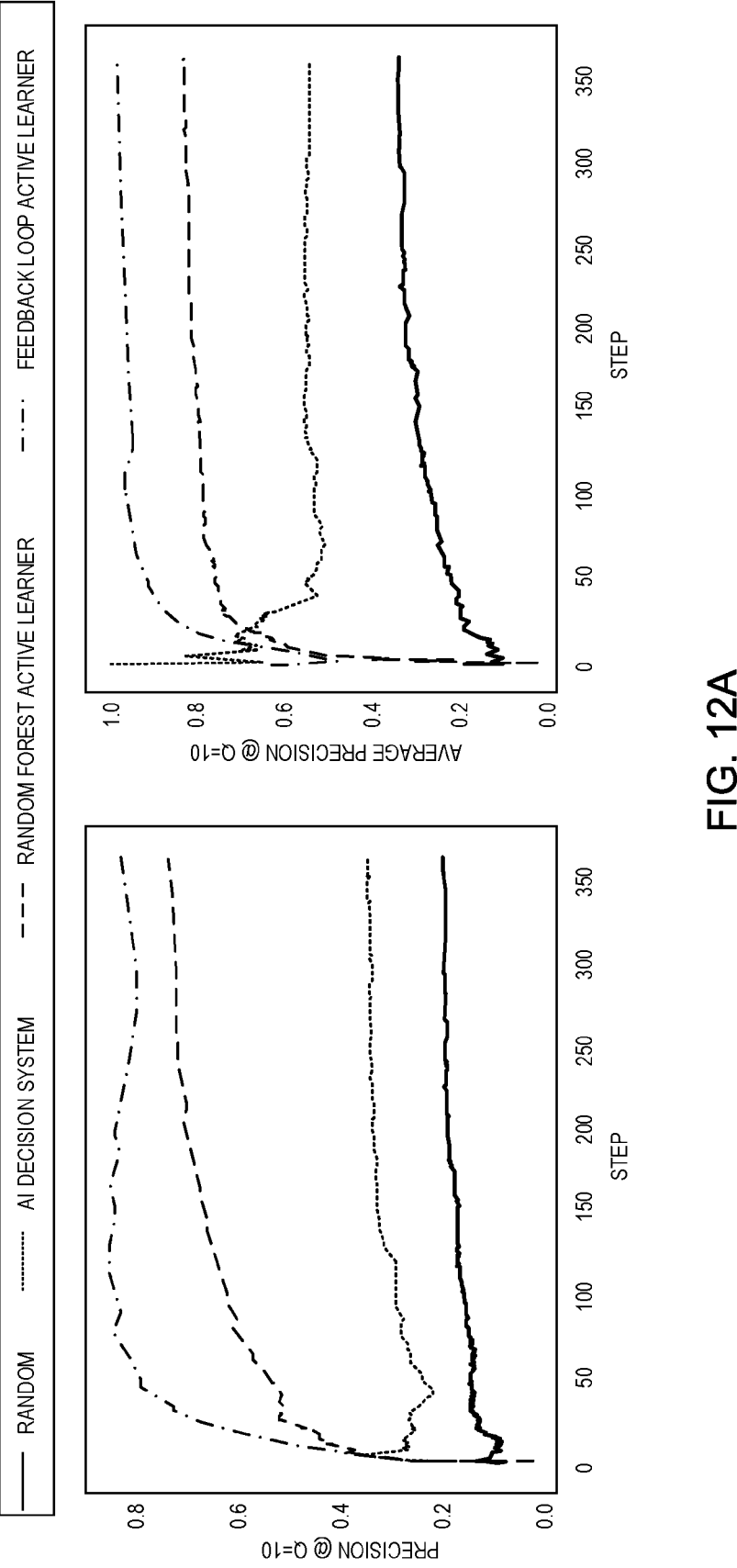
FIGS. 12A-12B show graphs of precision@Q and average precision@Q as a function of steps for Q is 10 and Q is 20, respectively.
Figure 12B:
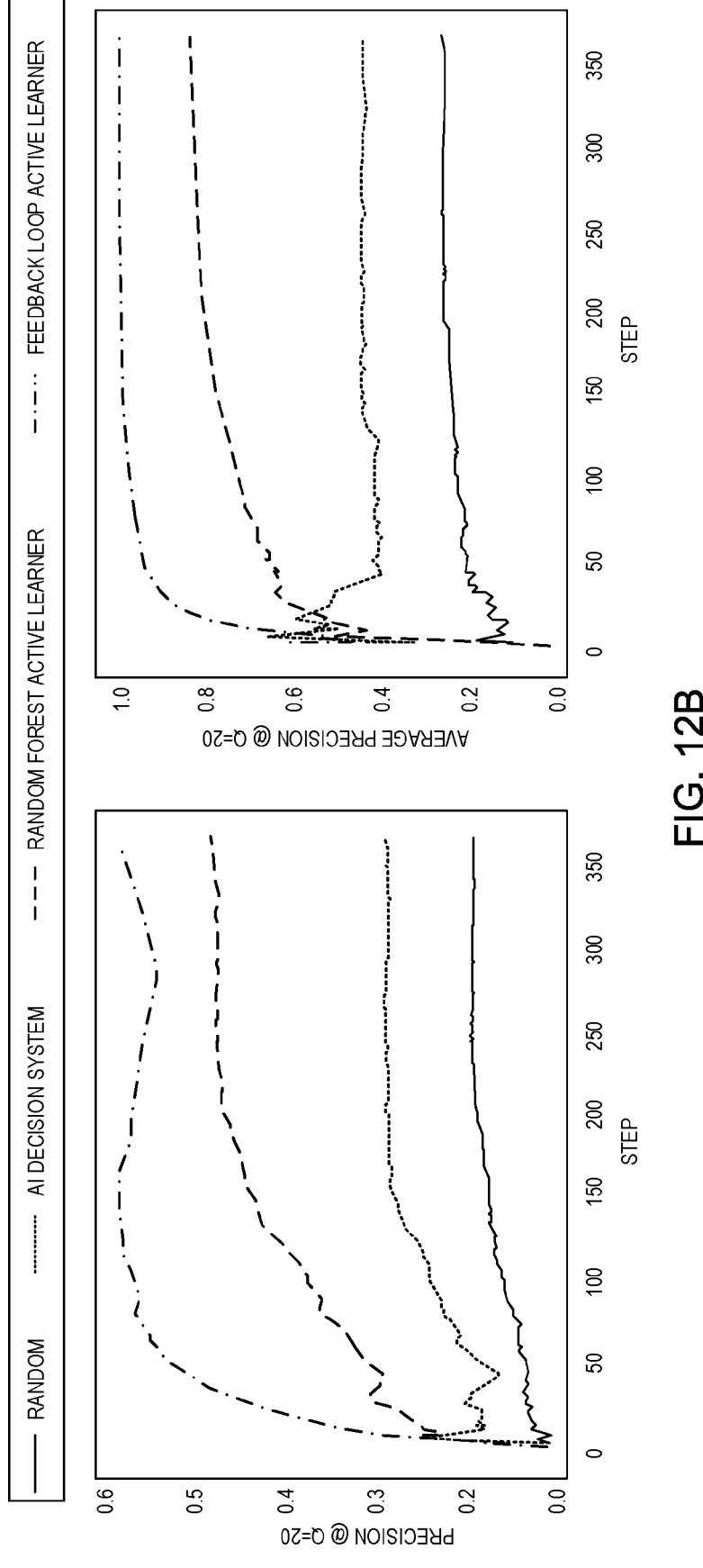

FIGS. 12A-12B, precision@Q and average precision@Q are shown for Q is 10and Q is 20. A cumulative average of precision performance is calculated at each step. It is noted that this performance reflects the improved AI decision performance since the user's interest/expertise label is used as a ground truth decision. From FIGS. 12A-12B it can be seen that FLAL outperforms the competing baselines at all reported metrics, and especially after 10-20 steps.

Another consideration of learning human interest is convergence speed. FLAL converges around step 50, which is faster than the best baseline Random Forest Active Learner.

From FIGS. 12A-12B, it is noted that the AI Decision System is not enough. Active learner mechanisms improve the performance drastically, while random decisions are still worse than the original AI decision system. Another notable difference between Q=10 and Q=20 is in precision@Q performance. When Q=20, the performance drops below 0.6. However, this essentially could happen because the number of anomalies in the data is hardly more than 12 (e.g., 20×0.6) at a certain time. This suggests that the number of recommended entities should be optimized based on the number of anomalies at every step of using the same values as the budget Q. The average precision is less vulnerable at this issue since the leading zeros do not affect the result. For both Q, their performance is close to each other.

Figure 13:
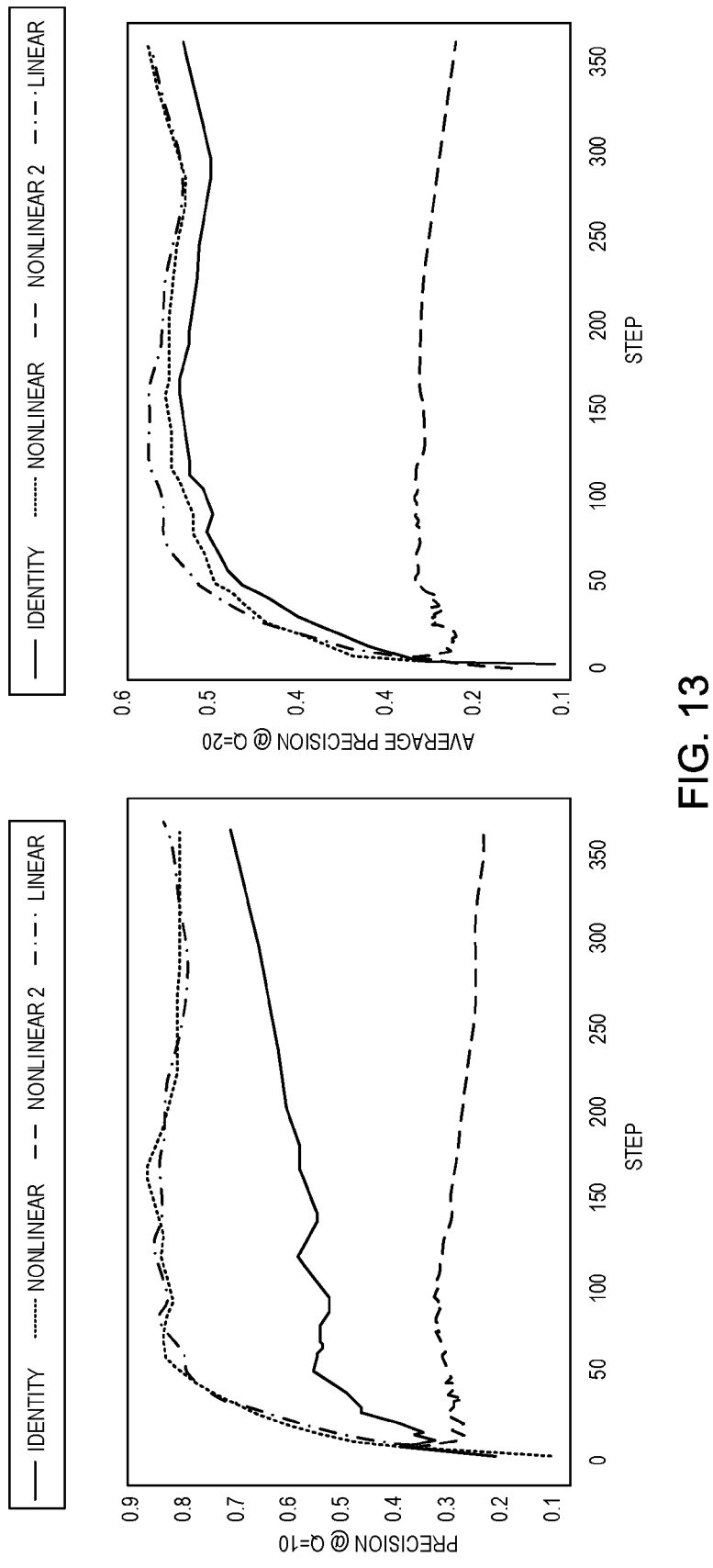
FIG. 13 shows graphs of precision@Q as a function of steps for Q is 10 and Q is 20 for various user embedder layer types.

Referring to FIG. 13, an ablation study on different user embedding mapper layers using precision@10 and precision@20 are shown. The examples compare identity, linear, non-linear, and non-linear-2 (2 non-linear layers) user embedding mapper layers. The identity layer returns the same embedding space and the non-linear layers use a sigmoid activation. The results suggest that one linear layer captures enough information, and as much as one non-linear layer. On the other hand. The identity layer has gradually increasing performance for precision@10, but with a slower convergence rate. Non-linear-2 has the worst performance, which may be due to overfitting due to the lack of data points.

Figure 14:
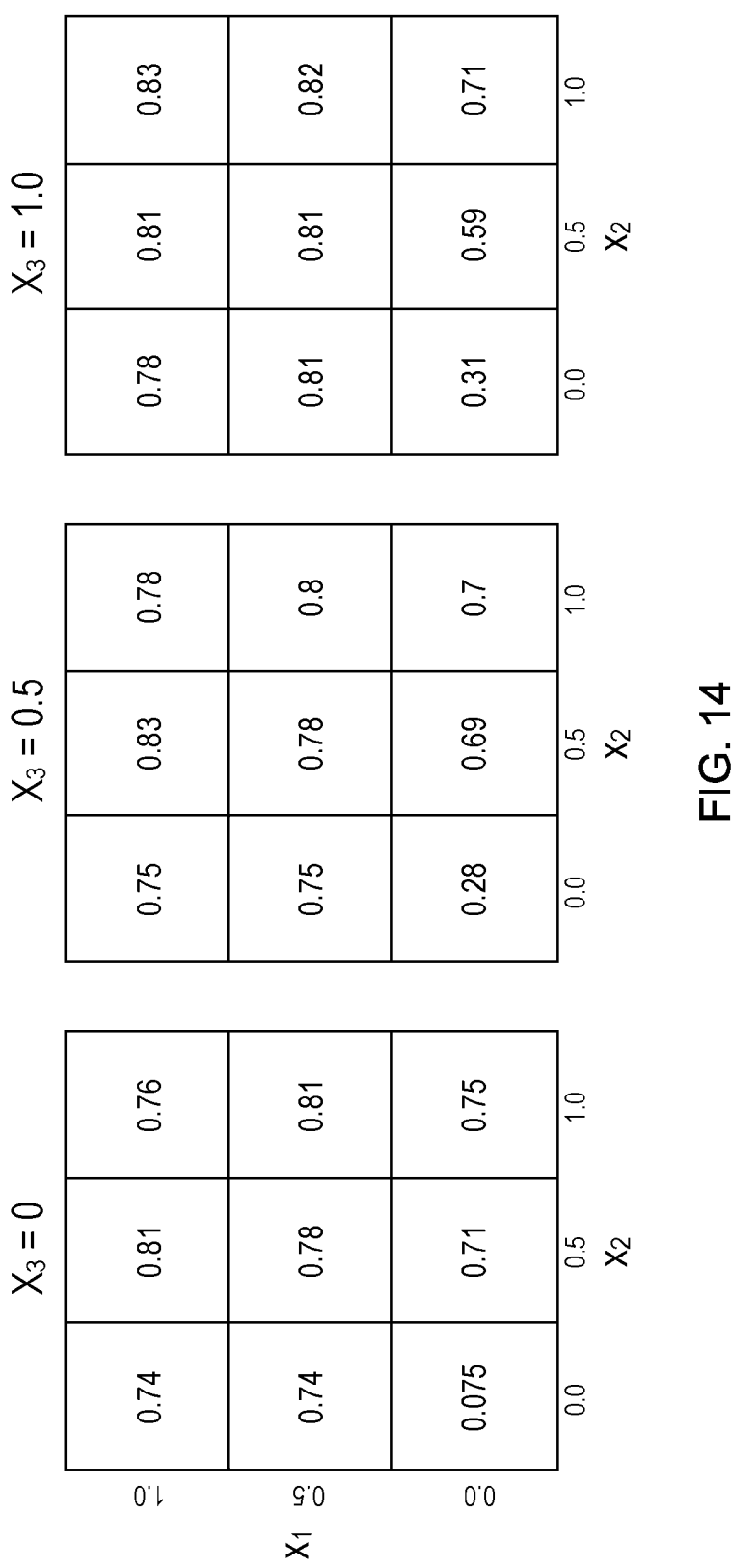
FIG. 14 shows a loss function term sensitivity analysis.

Referring to FIG. 14, a loss function term sensitivity analysis is shown. Each block represents the last step cumulative average of precision@10 scores from FLAL parameterized by different $x_1$, $x_2$, and $x_3$ values. The results suggest that all terms contribute to performance. The absence of the first term (e.g., $x_1$=0) makes the model performance poor. The second term ($x_2$) is not as effective as the first term, but increasing its value still makes the performance better. The third term ($x_3$) has a similar effect as the second term. They both aim to narrow the positive and negative sample rankings. The best performance was achieved when hyperparameters area equal to 1 or $x_1$=1, $x_2$=0.5, and $x_3$=0.5.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:

for each payment transaction of a plurality of payment transactions, generating, with a machine learning model of a machine learning system, an authorization decision based on transaction data associated with each of the plurality of payment transactions;

transmitting, with the machine learning system, the authorization decisions to a payment network processing the plurality of payment transactions;

forming, with the machine learning system, a data set comprising a plurality of data records, the data set comprising the transaction data and the authorization decisions associated with the plurality of payment transactions processed over the payment network, each data record associated with a payment transaction of the plurality of payment transactions, each of the plurality of payment transactions associated with an entity comprising a merchant;

transmitting, with the machine learning system, the data set to an active learning system comprising a plurality of subsystems, each subsystem comprising a separate machine learning model;

inputting, with the active learning system, the data set to a first subsystem of the plurality of subsystems, the first subsystem comprising a pre-trained first machine learning model;

based on the data set, generating, with the first machine learning model, a plurality of first embedding vectors, each respective first embedding vector of the plurality of first embedding vectors associated with a respective payment transaction of the plurality of payment transactions;

inputting, with the active learning system, the plurality of first embedding vectors to a second subsystem of the plurality of subsystems, the second subsystem comprising a second machine learning model;

based on the plurality of first embedding vectors, generating, with the second machine learning model, a plurality of second embedding vectors by mapping each respective first embedding vector of the plurality of first embedding vectors to a respective second embedding vector in a user-specific embedding space associated with a user;

inputting, with the active learning system, the plurality of second embedding vectors to a third subsystem of the plurality of subsystems, the third subsystem comprising a third machine learning model;

extracting, with the third machine learning model, feature data associated with at least one feature based on the plurality of second embedding vectors;

inputting, with the active learning system, an output from a machine learning system and the feature data to a fourth subsystem of the plurality of subsystems, the fourth subsystem comprising a fourth machine learning model;

based on the output from the machine learning system and the feature data, generating, with the fourth machine learning model, a relevance score for each payment transaction of the plurality of payment transactions;

determining, with the active learning system, a subset of payment transactions of the plurality of payment transactions based on the relevance score for each payment transaction of the subset of payment transactions;

communicating, with the active learning system, a feedback request to a user device of the user based on the subset of payment transactions;

receiving, with the active learning system, feedback data from the user device for each payment transaction of the subset of payment transactions, the feedback data comprising first data representing whether the user agrees with the authorization decision generated by the machine learning system for the payment transaction and second data representing a user's level of expertise for the payment transaction;

training, with the active learning system, at least one of the following: the second machine learning model, the third machine learning model, the fourth machine learning model, or any combination thereof based on the second data;

training, with the machine learning system, the machine learning model of the machine learning system based on the first data to form updated machine learning model;

receiving, with the machine learning system and from the payment network, an authorization request associated a subsequent payment transaction;

generating, with the updated machine learning model of the machine learning system, an authorization decision for the subsequent payment transaction based on transaction data associated with the subsequent payment transaction.

2. The method of claim 1, wherein training the at least one of the following: the second machine learning model, the third machine learning model, the fourth machine learning model, or any combination thereof comprises modifying at least one parameter of at least one of the following: the second machine learning model, the third machine learning model, the fourth machine learning model, or any combination thereof based on the second data.

3. The method of claim 1, wherein the first data comprises a binary classification for each payment transaction of the subset of payment transactions.

4. The method of claim 1, wherein the data set comprises multivariate time-series data comprising the plurality of data records, each respective data record of the plurality of data records comprising data elements based on a time sequence for a plurality of variables.

5. The method of claim 1, wherein training the at least one of the following: the second machine learning model, the third machine learning model, the fourth machine learning model, or any combination thereof comprises:

determining, with at least one processor, a loss based on the second data and a loss function; and training, with at least one processor, the at least one of the following: the second machine learning model, the third machine learning model, the fourth machine learning model, or any combination thereof based on the loss.

6. The method of claim 5, wherein the loss function comprises at least one of the following:

a first component to widen a gap between pairs of payment transactions of the subset of payment transactions having feedback data associated with a correct relative ranking between payment transactions of each pair of payment transactions based on the relevance scores thereof;

a second component configured to narrow a gap between pairs of payment transactions of the subset of payment transactions having feedback data associated with an incorrect relative ranking between payment transactions of each pair of payment transactions based on the relevance scores thereof;

a third component configured to narrow a gap between payment transactions of the subset of payment transactions having feedback data associated with an incorrect relative ranking between the payment transactions of the subset of payment transactions and other payment transactions of the plurality of payment transactions not included in the subset of payment transactions;

or any combination thereof.

7. The method of claim 6, wherein the loss function further comprises a first hyperparameter for the first component, a second hyperparameter for the second component, and a third hyperparameter for the third component.

8. The method of claim 1, wherein the subset of payment transactions comprises a predetermined number of payment transactions having one of a highest relevance score or a lowest relevance score.

9. A system comprising at least one processor configured to:

for each payment transaction of a plurality of payment transactions, generate, with a machine learning model, an authorization decision based on transaction data associated with each of the plurality of payment transactions;

transmit the authorization decisions to a payment network processing the plurality of payment transactions;

form a data set comprising a plurality of data records, the data set comprising the transaction data and the authorization decisions associated with the plurality of payment transactions processed over the payment network, each data record associated with a payment transaction of the plurality of payment transactions, each of the plurality of payment transactions associated with an entity comprising a merchant;

transmit the data set to an active learning system comprising a plurality of subsystems, each subsystem comprising a separate machine learning model;

input the data set to a first subsystem of the plurality of subsystems, the first subsystem comprising a pre-trained first machine learning model;

based on the data set, generate, with the first machine learning model, a plurality of first embedding vectors, each respective first embedding vector of the plurality of first embedding vectors associated with a respective payment transaction of the plurality of payment transactions;

input the plurality of first embedding vectors to a second subsystem of the plurality of subsystems, the second subsystem comprising a second machine learning model;

based on the plurality of first embedding vectors, generate, with the second machine learning model, a plurality of second embedding vectors by mapping each respective first embedding vector of the plurality of first embedding vectors to a respective second embedding vector in a user-specific embedding space associated with a user;

input the plurality of second embedding vectors to a third subsystem of the plurality of subsystems, the third subsystem comprising a third machine learning model;

extract, with the third machine learning model, feature data associated with at least one feature based on the plurality of second embedding vectors;

input an output from a machine learning system and the feature data to a fourth subsystem of the plurality of subsystems, the fourth subsystem comprising a fourth machine learning model;

based on the output from the machine learning system and the feature data, generate, with the fourth machine learning model, a relevance score for each payment transaction of the plurality of payment transactions;

determine a subset of payment transactions of the plurality of payment transactions based on the relevance score for each payment transaction of the subset of payment transactions;

communicate a feedback request to a user device of the user based on the subset of payment transactions;

receive feedback data from the user device for each payment transaction of the subset of payment transactions, the feedback data comprising first data representing whether the user agrees with the authorization decision generated by the machine learning system for the payment transaction and second data representing a user's level of expertise for the payment transaction;

train at least one of the following: the second machine learning model, the third machine learning model, the fourth machine learning model, or any combination thereof based on the second data;

train the machine learning model of the machine learning system based on the first data to form updated machine learning model;

receive, from the payment network, an authorization request associated a subsequent payment transaction;

generate, with the updated machine learning model, an authorization decision for the subsequent payment transaction based on transaction data associated with the subsequent payment transaction.

10. The system of claim 9, wherein training the at least one of the following: the second machine learning model, the third machine learning model, the fourth machine learning model, or any combination thereof comprises modifying at least one parameter of at least one of the following: the second machine learning model, the third machine learning model, the fourth machine learning model, or any combination thereof based on the second data.

11. The system of claim 9, wherein the first data comprises a binary classification for each payment transaction of the subset of payment transactions.

12. The system of claim 9, wherein the data set comprises multivariate time-series data comprising the plurality of data records, each respective data record of the plurality of data records comprising data elements based on a time sequence for a plurality of variables.

13. The system of claim 9, wherein training the at least one of the following: the second machine learning model, the third machine learning model, the fourth machine learning model, or any combination thereof comprises the at least one processor configured to:

determine a loss based on the second data and a loss function; and train the at least one of the following: the second machine learning model, the third machine learning model, the fourth machine learning model, or any combination thereof based on the loss.

14. The system of claim 13, wherein the loss function comprises at least one of the following:

a first component to widen a gap between pairs of payment transactions of the subset of payment transactions having feedback data associated with a correct relative ranking between payment transactions of each pair of payment transactions based on the relevance scores thereof;

a second component configured to narrow a gap between pairs of payment transactions of the subset of payment transactions having feedback data associated with an incorrect relative ranking between payment transactions of each pair of payment transactions based on the relevance scores thereof;

a third component configured to narrow a gap between payment transactions of the subset of payment transactions having feedback data associated with an incorrect relative ranking between the payment transactions of the subset of payment transactions and other payment transactions of the plurality of payment transactions not included in the subset of payment transactions;

or any combination thereof.

15. The system of claim 14, wherein the loss function further comprises a first hyperparameter for the first component, a second hyperparameter for the second component, and a third hyperparameter for the third component.

16. A computer program product, comprising at least one non-transitory computer-readable medium including program instructions that, when executed by a machine learning system and an active learning system, cause the machine learning system and the active learning system to:

for each payment transaction of a plurality of payment transactions, generate, with a machine learning model of the machine learning system, an authorization decision based on transaction data associated with each of the plurality of payment transactions;

transmit, with the machine learning system, the authorization decisions to a payment network processing the plurality of payment transactions;

form, with the machine learning system, a data set comprising a plurality of data records, the data set comprising the transaction data and the authorization decisions associated with the plurality of payment transactions processed over the payment network, each data record associated with a payment transaction of the plurality of payment transactions, each of the plurality of payment transactions associated with an entity comprising a merchant;

transmit, with the machine learning system, the data set to the active learning system comprising a plurality of subsystems, each subsystem comprising a separate machine learning model;

input, with the active learning system, the data set to a first subsystem of the plurality of subsystems, the first subsystem comprising a pre-trained first machine learning model;

based on the data set, generate, with the first machine learning model, a plurality of first embedding vectors, each respective first embedding vector of the plurality of first embedding vectors associated with a respective payment transaction of the plurality of payment transactions;

input, with the active learning system, the plurality of first embedding vectors to a second subsystem of the plurality of subsystems, the second subsystem comprising a second machine learning model;

based on the plurality of first embedding vectors, generate, with the second machine learning model, a plurality of second embedding vectors by mapping each respective first embedding vector of the plurality of first embedding vectors to a respective second embedding vector in a user-specific embedding space associated with a user;

input, with the active learning system, the plurality of second embedding vectors to a third subsystem of the plurality of subsystems, the third subsystem comprising a third machine learning model;

extract, with the third machine learning model, feature data associated with at least one feature based on the plurality of second embedding vectors;

input, with the active learning system, an output from the machine learning system and the feature data to a fourth subsystem of the plurality of subsystems, the fourth subsystem comprising a fourth machine learning model;

based on the output from the machine learning system and the feature data, generate, with the fourth machine learning model, a relevance score for each payment transaction of the plurality of payment transactions;

determine, with the active learning system, a subset of payment transactions of the plurality of payment transactions based on the relevance score for each payment transaction of the subset of payment transactions;

communicate, with the active learning system, a feedback request to a user device of the user based on the subset of payment transactions;

receive, with the active learning system, feedback data from the user device for each payment transaction of the subset of payment transactions, the feedback data comprising first data representing whether the user agrees with the authorization decision generated by the machine learning system for the payment transaction and second data representing a user's level of expertise for the payment transaction;

train, with the active learning system, at least one of the following: the second machine learning model, the third machine learning model, the fourth machine learning model, or any combination thereof based on the second data;

train, with the machine learning system, the machine learning model of the machine learning system based on the first data to form updated machine learning model;

receive, with the machine learning system and from the payment network, an authorization request associated a subsequent payment transaction;

generate, with the updated machine learning model of the machine learning system, an authorization decision for the subsequent payment transaction based on transaction data associated with the subsequent payment transaction.

17. The method of claim 1, further comprising:

determining, with the active learning system, that the payment transaction is relevant to the user from a plurality of users based on the second embedding vector in the user-specific embedding space.

* * * * *